US011492827B1

(12) United States Patent
Flannery et al.

(10) Patent No.: US 11,492,827 B1
(45) Date of Patent: Nov. 8, 2022

(54) LATCH APPARATUS

(71) Applicant: Carlson Pet Products, Inc., Longboat Key, FL (US)

(72) Inventors: Mark A. Flannery, Longboat Key, FL (US); Brian G. Linehan, Saint Paul, MN (US)

(73) Assignee: Carlson Pet Products, Inc., Longboat Key, FL (US)

( * ) Notice: Subject to any disclaimer, the term of this patent is extended or adjusted under 35 U.S.C. 154(b) by 375 days.

(21) Appl. No.: 16/571,061

(22) Filed: Sep. 14, 2019

Related U.S. Application Data

(63) Continuation of application No. 15/231,471, filed on Aug. 8, 2016, now Pat. No. 10,415,279, which is a
(Continued)

(51) Int. Cl.
*E05C 3/04* (2006.01)
*E05C 1/10* (2006.01)
(Continued)

(52) U.S. Cl.
CPC ............... *E05C 3/042* (2013.01); *A01K 1/03* (2013.01); *E05B 1/00* (2013.01); *E05B 1/0053* (2013.01); *E05B 65/0007* (2013.01); *E05B 65/06* (2013.01); *E05C 1/08* (2013.01); *E05C 1/10* (2013.01); *E05C 3/14* (2013.01); *E06B 3/32* (2013.01); *E06B 3/52* (2013.01); *E06B 11/02* (2013.01); *E06B 11/021* (2013.01); *E06B 11/022* (2013.01); *E05B 15/0093* (2013.01); *Y10S 292/29* (2013.01); *Y10S 292/63* (2013.01); *Y10T 292/107* (2015.04);
(Continued)

(58) Field of Classification Search
CPC ......... Y10T 292/1043; Y10T 292/1063; Y10T 292/1064; Y10T 292/107; Y10T 292/1072; Y10T 292/1075; Y10T 292/108; Y10T 292/34; Y10T 292/37; Y10T 292/394; Y10T 292/68; Y10T 292/1078; E05C 3/042; E05C 1/08; E05C 1/10; E05C 3/14; A01K 1/03; E05B 1/00; E05B 1/0053; E05B 65/0007; E05B 65/06; E05B 15/0093; E06B 3/32; E06B 3/52; E06B 11/02; E06B 11/021; E06B 11/022; Y10S 292/29; Y10S 292/63
See application file for complete search history.

(56) References Cited

U.S. PATENT DOCUMENTS

| 842,046 A | 1/1907 | Williams |
|---|---|---|
| 913,410 A | 2/1909 | Marbach |

(Continued)

*Primary Examiner* — Christine M Mills
*Assistant Examiner* — Faria F Ahmad

(57) ABSTRACT

A wire crate latch apparatus having, in a first embodiment, a pivoting member that is continually drawn to a closed position by gravity and that is deflected into a catch when the door having the pivoting member is swung closed. The latch apparatus further includes upper and lower stops to contain a distal end of the pivoting member and to hold the distal end in the position to hit an oblique portion of the catch when the door is closed. In a second embodiment, a sliding latch apparatus is deflected by a catch and is relatively inaccessible from inside of the wire crate by back plates on the latch and catch.

14 Claims, 14 Drawing Sheets

Related U.S. Application Data continuation of application No. 14/588,827, filed on Jan. 2, 2015, now Pat. No. 9,410,348.

(60) Provisional application No. 62/041,142, filed on Aug. 24, 2014, provisional application No. 61/923,668, filed on Jan. 4, 2014.

(51) Int. Cl.

| | | |
|---|---|---|
| *E05B 65/06* | (2006.01) | |
| *E05B 1/00* | (2006.01) | |
| *E05B 65/00* | (2006.01) | |
| *E06B 11/02* | (2006.01) | |
| *E06B 3/32* | (2006.01) | |
| *E06B 3/52* | (2006.01) | |
| *E05C 1/08* | (2006.01) | |
| *E05C 3/14* | (2006.01) | |
| *A01K 1/03* | (2006.01) | |
| *E05B 15/00* | (2006.01) | |

(52) U.S. Cl.
CPC ...... *Y10T 292/108* (2015.04); *Y10T 292/1043* (2015.04); *Y10T 292/1063* (2015.04); *Y10T 292/1064* (2015.04); *Y10T 292/1072* (2015.04); *Y10T 292/1075* (2015.04); *Y10T 292/1078* (2015.04); *Y10T 292/34* (2015.04); *Y10T 292/37* (2015.04); *Y10T 292/394* (2015.04); *Y10T 292/68* (2015.04)

(56) References Cited

U.S. PATENT DOCUMENTS

| | | | |
|---|---|---|---|
| 965,238 A | 7/1910 | Shoff | |
| 1,052,664 A | 2/1913 | Hester | |
| 1,091,453 A | 3/1914 | Fletcher | |
| 1,110,779 A | 9/1914 | Hartman | |
| 1,183,575 A | 5/1916 | Longenecker | |
| 1,241,192 A | 9/1917 | Bruder | |
| 1,289,708 A | 12/1918 | Enok | |
| 1,389,339 A | 8/1921 | Anderson | |
| 1,579,457 A | 4/1926 | Schlage | |
| 1,654,256 A * | 12/1927 | Hill | B64C 1/14 |
| | | | 292/173 |
| 1,696,045 A | 12/1928 | Lach | |
| 1,891,224 A | 12/1932 | Edwards | |
| 1,908,388 A | 5/1933 | Watson | |
| 2,153,819 A * | 4/1939 | Van Voorhees | E05B 65/005 |
| | | | 292/164 |
| 2,350,635 A | 6/1944 | Pendleton | |
| 2,353,844 A * | 7/1944 | Milner | E05B 17/2003 |
| | | | 292/341.17 |
| 2,389,056 A | 11/1945 | Jamison | |
| 2,390,756 A | 12/1945 | Voight | |
| 2,412,497 A | 12/1946 | Edwards | |
| 2,445,285 A | 7/1948 | Wartian | |
| 2,446,206 A | 8/1948 | Beckman | |
| 2,486,772 A | 11/1949 | Wuerl | |
| 2,535,444 A | 12/1950 | Miller | |
| 2,553,023 A | 5/1951 | Walters | |
| 2,558,361 A | 6/1951 | Johnston | |
| 2,575,465 A | 11/1951 | Patton | |
| 2,604,347 A | 7/1952 | Snyder | |
| 2,645,516 A | 7/1953 | Robertson | |
| 2,669,473 A | 2/1954 | Trumbo | |
| 2,683,049 A | 7/1954 | Van Der Spek | |
| 2,783,911 A * | 3/1957 | Bussing | B65D 19/10 |
| | | | 220/7 |
| 2,804,327 A | 8/1957 | Williams | |
| 2,860,903 A * | 11/1958 | Narancich | E05B 65/06 |
| | | | 292/48 |
| 2,964,346 A | 12/1960 | Check | |
| 2,969,999 A | 1/1961 | Herman | |
| 3,007,732 A | 11/1961 | Schlage | |
| 3,025,693 A | 3/1962 | Braginetz | |
| 3,087,750 A * | 4/1963 | Kelly | E05C 9/02 |
| | | | 292/161 |
| 3,089,720 A | 5/1963 | Schlage | |
| 3,104,904 A | 9/1963 | Jacobs | |
| 3,266,831 A | 8/1966 | Banse | |
| 3,287,055 A | 11/1966 | Schlage | |
| 3,353,858 A | 11/1967 | Neary | |
| 3,378,289 A | 4/1968 | Beckman | |
| 3,433,518 A * | 3/1969 | Foltz | E05C 3/24 |
| | | | 292/238 |
| 3,480,316 A * | 11/1969 | Westover | E05C 1/08 |
| | | | 292/175 |
| 3,697,106 A | 10/1972 | Meyer | |
| 3,825,289 A | 7/1974 | Armstrong | |
| 3,907,347 A | 9/1975 | Hollis | |
| 3,955,837 A * | 5/1976 | Christensen | A01K 1/0017 |
| | | | 292/173 |
| 3,967,845 A | 7/1976 | Governale | |
| 4,118,055 A | 10/1978 | Bischoff | |
| 4,124,238 A | 11/1978 | Bischoff | |
| 4,135,747 A | 1/1979 | Melilli | |
| 4,181,338 A | 1/1980 | Sterling | |
| 4,451,072 A | 5/1984 | Petty, Sr. | |
| 4,496,178 A | 1/1985 | Best | |
| 4,653,787 A | 3/1987 | Fang | |
| 4,726,613 A | 2/1988 | Foshee | |
| 4,813,724 A | 3/1989 | Dietrich | |
| 4,893,850 A | 1/1990 | Mizusawa | |
| 4,947,661 A | 8/1990 | Yoshida | |
| 5,078,438 A | 1/1992 | Bieganski | |
| 5,116,090 A | 5/1992 | Nichandros | |
| 5,127,685 A | 7/1992 | Dallaire | |
| 5,141,268 A | 8/1992 | Keller | |
| 5,217,265 A | 6/1993 | Lerner | |
| D339,056 S | 9/1993 | Black | |
| 5,292,191 A | 3/1994 | Slivon | |
| 5,445,451 A | 8/1995 | Harmony | |
| 5,476,133 A | 12/1995 | Torkelson | |
| 5,498,041 A | 3/1996 | Bezzerides | |
| 5,518,040 A | 5/1996 | Rupflin | |
| 5,573,287 A | 11/1996 | Takimoto | |
| 5,639,129 A | 6/1997 | Lindley | |
| 5,655,801 A | 8/1997 | Casey | |
| 5,794,991 A | 8/1998 | Smallegan | |
| 5,816,629 A | 10/1998 | Donald | |
| 5,868,478 A | 2/1999 | Yemini | |
| 5,918,916 A | 7/1999 | Kajuch | |
| 5,970,656 A | 10/1999 | Maier | |
| 6,003,908 A | 12/1999 | King | |
| 6,021,603 A | 2/2000 | Prete | |
| 6,048,001 A | 4/2000 | Miller | |
| 6,116,461 A | 9/2000 | Broadfield | |
| 6,183,024 B1 | 2/2001 | Schultz | |
| 6,349,981 B1 | 2/2002 | King | |
| 6,547,289 B1 | 4/2003 | Greenheck | |
| 6,550,824 B1 | 4/2003 | Ramsauer | |
| 6,832,792 B2 | 12/2004 | Polowinczak | |
| 6,951,318 B1 | 10/2005 | Petersen | |
| 7,021,678 B1 | 4/2006 | Raoult | |
| 7,171,784 B2 | 2/2007 | Eenigenburg | |
| 7,201,030 B2 | 4/2007 | Timothy | |
| 7,255,375 B2 | 8/2007 | Heid | |
| 7,261,332 B2 | 8/2007 | Petersen | |
| 7,407,200 B2 | 8/2008 | Ichimaru | |
| 7,431,355 B2 | 10/2008 | Eenigenburg | |
| 7,520,542 B1 | 4/2009 | Price | |
| 7,540,046 B1 * | 6/2009 | Lai | A47D 13/065 |
| | | | 256/26 |
| 7,726,706 B2 | 6/2010 | Moran | |
| 7,878,558 B1 | 2/2011 | Bell | |
| 7,963,575 B2 | 6/2011 | Mayo | |
| 8,047,582 B1 | 11/2011 | Rodgers | |
| 8,061,082 B2 | 11/2011 | Garries | |
| 8,297,665 B2 | 10/2012 | Ramsauer | |
| 8,376,478 B2 | 2/2013 | Weber | |
| 8,393,655 B2 | 3/2013 | Barge | |
| 8,607,502 B2 | 12/2013 | Flannery | |
| 8,608,213 B2 | 12/2013 | Homner | |

(56) References Cited

U.S. PATENT DOCUMENTS

| | | |
|---|---|---|
| 8,615,928 B2 | 12/2013 | Wang |
| 8,636,308 B2 | 1/2014 | Calamia |
| 8,702,134 B2 | 4/2014 | Lesjak |
| 8,770,634 B2 * | 7/2014 | Loret de Mola ....... E05B 83/16 |
| | | 292/169 |
| 8,974,641 B2 | 3/2015 | Weber |
| 9,243,427 B2 | 1/2016 | Weber |
| 9,528,306 B2 | 12/2016 | Wepf |
| 9,637,959 B2 | 5/2017 | Marsden |
| 9,717,335 B2 | 8/2017 | Zhang |
| 9,795,052 B2 | 10/2017 | Hsiao |
| 9,796,076 B2 | 10/2017 | Baruch |
| D811,198 S | 2/2018 | Kennaugh |
| 10,000,944 B2 | 6/2018 | Cavallaro |
| 2002/0145289 A1 | 10/2002 | Cole |
| 2002/0145292 A1 | 10/2002 | Furner |
| 2003/0230901 A1 | 12/2003 | Krynski |
| 2006/0220391 A1 | 10/2006 | Baragano Gonzalez |
| 2008/0142522 A1 | 6/2008 | Maid |
| 2008/0174126 A1 | 7/2008 | Kong |
| 2009/0173009 A1 * | 7/2009 | Garries ..................... E05C 1/10 |
| | | 49/176 |
| 2010/0109349 A1 | 5/2010 | Peabody |
| 2014/0210221 A1 | 7/2014 | Mitchell |
| 2014/0215924 A1 | 8/2014 | Evans |
| 2014/0225383 A1 | 8/2014 | Simmonds |
| 2014/0271412 A1 | 9/2014 | Hovatter |
| 2015/0021317 A1 | 1/2015 | Sharkey |
| 2015/0084347 A1 | 3/2015 | Olsson |
| 2016/0115722 A1 | 4/2016 | Vasilion |
| 2016/0137041 A1 | 5/2016 | Dylewski, II |
| 2016/0251793 A1 | 9/2016 | Finney |

* cited by examiner

LATCH APPARATUS

This application is a continuation, and claims the benefit under 35 U.S.C. § 120, of U.S. Nonprovisional patent application Ser. No. 15/231,471 filed Aug. 8, 2016, which application is a continuation, and claims the benefit under 35 U.S.C. § 120, of U.S. Nonprovisional patent application Ser. No. 14/588,827 filed Jan. 2, 2015, which claims the benefit under 35 U.S.C. 119(e) of the following U.S. provisional application numbers: 1) 61/923,668 filed Jan. 4, 2014, and 2) 62/041,142 filed Aug. 24, 2014, all of which nonprovisional and provisional applications are hereby incorporated by reference in their entireties into this application.

FIELD OF THE INVENTION

The present invention relates generally to a latch apparatus, more particularly to a latch apparatus for latching first and second pieces together where the first and second pieces swing relative to each other, and specifically for latching a swingable door of a wire crate to the remainder of the wire crate where the latch pivots or slides and is deflected into a catch.

BACKGROUND OF THE INVENTION

A pet or other animal may be placed in a wire crate at night or during transport by automobile or plane. The wire crate may have multiple sides, such as six sides. One or more of these sides may be cage-like and have a network of wires or rod-like elongate members. The door may have a network of wires or rod-like elongate members. The side of the wire crate having the door may have a network of wires or rod-like elongate members.

Some animals are adept at figuring out latches. For example, a latch that moves to an open position and remains at the open position is particularly easy for certain animals to decipher. A cage having such a latch offers little resistance to escape.

SUMMARY OF THE INVENTION

A feature of the present invention is a latch apparatus for latching first and second pieces together.

Another feature of the present invention is a latch apparatus for latching first and second pieces together where the first and second pieces swing relative to each other.

Another feature of the present invention is a latch apparatus for a wire crate.

Another feature of the present invention is a latch apparatus for latching a swingable door of a wire crate to the remainder of the wire crate.

Another feature of the present invention is the provision in a wire crate latch apparatus, of a pivoting member where the pivoting member includes a proximal end, a distal end, and an intermediate section between the proximal and distal ends, where the pivoting member is on the first piece, where the distal end of the pivoting member pivots up and down in a first plane, and where the pivoting member includes a pivot axis about which the pivoting member pivots.

Another feature of the present invention is the provision in a wire crate latch apparatus, of a catch having an oblique portion, where the catch is on the second piece, where the oblique portion includes an upper end, a lower end, and a first oblique surface extending between the upper and lower ends for deflecting the pivoting member into the catch.

Another feature of the present invention is the provision in a wire crate latch apparatus, of the upper end of the catch being spaced from the second piece by a first distance and defining a catch space, and of the lower end of the catch being spaced from the second piece by a second distance, where the second distance is greater than the first distance, and where the first plane extends between the upper end and the second piece when the first and second pieces are closed.

Another feature of the present invention is the provision in a wire crate latch apparatus, of the first oblique surface extending upwardly and inwardly such that, when the first piece and pivoting member are swinging inwardly, the first oblique surface directs or deflects the pivoting member to pivot upwardly and over the upper end of the oblique portion, whereupon the pivoting member falls by gravity into the catch space.

Another feature of the present invention is the provision in a wire crate latch apparatus, of an upper stop and a lower stop, where the upper and lower stops extend from the first piece, where the upper and lower stops are spaced apart from each other, where the pivoting member is disposed between the upper stop and the lower stop, where the upper stop stops pivoting of the pivoting member in one direction, and where the lower stop stops pivoting of the pivoting member in the other direction.

Another feature of the present invention is the provision in a wire crate latch apparatus, of a part of the intermediate section resting on the lower stop and the distal end extending beyond said lower stop when said pivoting member is at rest.

Another feature of the present invention is the provision in a wire crate latch apparatus, of the catch including a bottom, where the bottom of the catch is at a lower level than the lower stop when the two pieces are closed such that the pivoting member rests on the lower stop and above the bottom of the catch when the two pieces are closed.

Another feature of the present invention is the provision in a wire crate latch apparatus, of the upper and lower stops being interconnected by a traversing member, the pivoting member extending between the traversing member and the first piece.

Another feature of the present invention is the provision in a wire crate latch apparatus, of the oblique portion including a U-shaped wire section, where the U-shaped wire section includes the first oblique surface, a second oblique surface coplanar with the first oblique surface and spaced apart from the first oblique surface, and a cross member extending between the first and second oblique surfaces and defining the upper end of the oblique portion.

Another feature of the present invention is the provision in a wire crate latch apparatus, of the catch including a base, where the base is on the second piece, where the base includes a top end and a bottom end, where the top end of the base is above the upper end of the oblique portion to counter an outward drawing of the upper end of the oblique portion by the pivoting member when the first and second pieces are being pushed apart from each other without pivoting the pivoting member out of the catch space.

Another feature of the present invention is the provision in a wire crate latch apparatus, of the catch including a base, where the base is L-shaped and includes an outer end, and where the outer end engages the lower end of the oblique portion.

Another feature of the present invention is the provision in a wire crate latch apparatus, of the catch including a base, where the base includes first and second wire sections, where each of the wire sections is L-shaped and includes an outer end, and where each of the outer ends of the wire sections engages the lower end of the oblique portion.

Another feature of the present invention is the provision in a wire crate latch apparatus, of the pivoting member including a pivot pin about which the pivoting member pivots, where the pivot pin is in the intermediate section, and where the pivot pin is on the pivot axis.

Another feature of the present invention is the provision in a wire crate latch apparatus, of the distal end of the pivoting member being spaced further from the pivot axis than the proximal end of the pivoting member.

Another feature of the present invention is the provision in a wire crate latch apparatus, of a finger receptor on the pivoting member, where the finger receptor permits a user to effectuate a pivoting of the pivoting member and a raising of the distal end of the pivoting member.

Another feature of the present invention is the provision in a wire crate latch apparatus, of the pivoting member including a front and a rear, where the finger receptor is on the front of the pivoting member.

Another feature of the present invention is the provision in a wire crate latch apparatus, of the finger receptor being adjacent to the pivot axis of the pivoting member.

Another feature of the present invention is the provision in a wire crate latch apparatus, of the finger receptor being between the pivot axis and the proximal end of the pivoting member such that a pushing down on the finger receptor raises the distal end of the pivoting member.

Another feature of the present invention is the provision in a wire crate latch apparatus, of the finger receptor being one of a) on the proximal end of the pivoting member and b) adjacent to the proximal end of the pivoting member.

Another feature of the present invention is the provision in a wire crate latch apparatus, of the distal end of the pivoting member being disposed in the catch space when the first and second pieces are closed.

Another feature of the present invention is the provision in a wire crate latch apparatus, of the catch including an outer end and an inner end, where the distal end of the pivoting member includes a distal edge, and where the distal edge of the pivoting member is between the outer and inner ends of the catch when the first and second pieces are closed.

Another feature of the present invention is the provision in a wire crate latch apparatus, of the distal end of the pivoting member swinging freely downwardly under the influence of gravity.

Another feature of the present invention is the provision in a wire crate latch apparatus, of the pivoting member being mounted on a plate which in turn is mounted on the first piece.

Another feature of the present invention is the provision in a wire crate latch apparatus, of the pivoting member including a rear face and a top edge, and of a latch oblique face between the rear face and top edge, where the latch oblique face is adjacent to the top edge, and where the latch oblique face is disposed to hit the first oblique surface of the catch when the first piece and pivoting member are swung inwardly.

Another feature of the present invention is the provision in a wire crate latch apparatus, of a latch including a sliding member, the sliding member having a proximal end and a distal end, the sliding member having a bias in a direction from the distal end to the proximal end of the sliding member such that the sliding member is biased to slide in the direction from the distal end to the proximal end of the sliding member.

Another feature of the present invention is the provision in a wire crate latch apparatus, of a catch for the latch, the catch being engaged to the second piece, the sliding member and catch engagable to each other and disengagable from each other, the catch comprising an oblique front portion and a back portion, the oblique front portion and back portion being spaced from each other, the oblique front portion such that, when the first piece and sliding member swing toward the second piece, the oblique surface directs the sliding member to slide against said bias to slide the sliding member over the proximal end of the oblique front portion, whereupon the sliding member reverses a slide direction to slide under the bias in the direction from the distal end to the proximal end of the sliding member such that the proximal end of the sliding member is pushed under proximal end of the oblique front portion such that the sliding member engages the catch.

Another feature of the present invention is the provision in a wire crate latch apparatus, of a latch including a coil spring having first and second ends and wherein the latch includes a back plate on which the sliding member slides, the back plate having an extension protruding into the sliding member, the sliding member having an intermediate section between the proximal and distal ends of the sliding member, and the coil spring being in the sliding member and between the extension of the back plate and the intermediate section of the sliding member such that the first end of the coil spring brings pressure to bear upon said extension and the second end of the coil spring brings pressure to bear upon said intermediate section such that the proximal end of the sliding member is normally biased in a direction from the distal end to the proximal end of the sliding member.

Another feature of the present invention is the provision in a wire crate latch apparatus, of a latch including a back plate on which the sliding member slides, one of the back plate and sliding member having a first slot, the other of the back plate and sliding member having a first guide pin extending into the first slot, the first slot defining a direction toward the catch such that the sliding member slides to and away from the catch.

Another feature of the present invention is the provision in a wire crate latch apparatus, of a latch including a back plate on which the sliding member slides, one of the back plate and sliding member having first and second slots, the other of the back plate and sliding member having first and second guide pins, the first guide pin extending into the first slot, the second guide pin extending into the second slot, and at least one of the first and second slots defining a direction toward the catch such that the sliding member slides to and away from the catch.

Another feature of the present invention is the provision in a wire crate latch apparatus, of the first and second slots being aligned with each other and each of the first and second slots defining a direction toward the catch such that the sliding member slides to and away from the catch.

Another feature of the present invention is the provision in a wire crate latch apparatus, of the first slot including proximal and distal ends, the proximal end being closer to said catch than the distal end, the proximal end of the first slot working as a proximal stop for the sliding member when the sliding member is at rest and the coil spring is in a most expanded state, the distal end of the first slot working as a distal stop for the sliding member when the coil spring is in a most contracted state.

Another feature of the present invention is the provision in a wire crate latch apparatus, of a latch including a front surface having a proximal surface section, a distal surface section, and an intermediate surface section between the proximal surface section and the distal surface section, the proximal surface section being closer to the catch than the distal surface section, the latch further having a back member spaced from the front surface and opposing the front surface, the back member defining a first plane, the proximal surface section being a first distance from the first plane, the intermediate surface section being a second distance from the first plane, and the distal surface section being a third distance from the first plane, the third distance being greater than the second distance, and the second distance being greater than the first distance.

Another feature of the present invention is the provision in a wire crate latch apparatus, of the latch including a front surface and a back member, the front surface and the back member opposing each other, the front surface having a proximal surface section, a distal surface section, and an intermediate surface section between the proximal surface section and the distal surface section, the proximal surface section being closer to the catch than the distal surface section, the proximal surface section of the latch engaging the catch, the distal surface section having a transverse wall extending in a direction away from the back member and away from the intermediate surface section, the transverse wall facing the catch such that, when a finger slides over the intermediate surface section toward the distal surface section, the finger engages the transverse wall to slide the sliding member against said bias.

Another feature of the present invention is the provision in a wire crate latch apparatus, of a proximal end of the sliding member including a first width less than the width of the catch space and wherein the distal end of the sliding member includes a transverse wall that is transverse relative to a direction that the sliding member slides, the transverse wall facing said catch such that a finger can engage the transverse wall and slide the latch against said bias to remove the proximal end of the sliding member from the catch space.

Another feature of the present invention is the provision in a wire crate latch apparatus, of a catch including a transverse portion extending between the back portion and the oblique front portion, the back portion engaging the distal end of the oblique front portion such that the proximal end of the oblique front portion is free such that the proximal end of the latch can slide under the proximal end of the oblique front portion.

Another feature of the present invention is the provision in a wire crate latch apparatus, of a catch including a transverse portion extending between the back portion and the oblique portion, each of the back portion, oblique portion and transverse portion defining a plane, the back portion and transverse portion being at a right angle relative to each other, the oblique portion being at an acute angle relative to the transverse portion.

Another feature of the present invention is the provision in a wire crate latch apparatus, of a latch including a back plate upon which the sliding member slides, the back plate of said latch defining a first plane, and the back portion of the catch being in said first plane when the first and second pieces are closed and latched to each other by said latch and catch.

Another feature of the present invention is the provision in a wire crate latch apparatus, of the latch including a sliding member and of the sliding member including a first cavity and a second cavity, and wherein the latch further includes a back plate, the sliding member sliding on the back plate, the first cavity being adjacent to the proximal end of the latch, the first and second cavities being separated by a transverse member, the back plate closing off the second cavity when the sliding member is in a normal biased position, at least a part of the first cavity being open relative to the back plate when the sliding member is in said normal biased position and the first piece has been swung away from the second piece.

Another feature of the present invention is the provision in a wire crate latch apparatus, of a latch including a sliding member and of the sliding member including a first cavity and a second cavity, and wherein the latch further includes a back plate, the sliding member sliding on the back plate, the first cavity being adjacent to the proximal end of the latch, the first and second cavities being separated by a transverse member, the back plate closing off the second cavity when the sliding member is in a normal biased position, and at least a part of a front face of said back plate being exposed when the sliding member is in a normal biased position.

Another feature of the present invention is the provision in a wire crate latch apparatus, of the latch including a sliding member and of the sliding member including a first cavity and a second cavity, and wherein the latch further includes a back plate, the sliding member sliding on the back plate, the first cavity being adjacent to the proximal end of the latch, the back plate closing off each of the first and second cavities when the sliding member has been fully slid against a bias of the sliding member.

Another feature of the present invention is the provision in a wire crate latch apparatus, of a latch including a sliding member and of the sliding member including a first cavity and a second cavity, and wherein the latch further includes a back plate, the sliding member sliding on the back plate, the first cavity being adjacent to the proximal end of the latch, the sliding member being slideable to a position where each of said first and second cavities is closed off by said back plate.

Another feature of the present invention is the provision in a wire crate latch apparatus, of a latch including a sliding member and of the sliding member including a back plate, and wherein the sliding member is slideable on each of the back plate and on the back portion of the catch when the first and second pieces have been swung together.

An advantage of the first embodiment of the present invention is that is utilizes gravity. To overcome the natural forces of gravity, the animal opening the latch must raise the latch, and then keep the latch in a raised position while swinging open the door. If the animal raises the latch and then releases the latch, the latch falls to the closed position and the animal is unable to open the door. The three step process of raising the latch, keeping the latch in a raised position, and then swinging open the door is a process that many animals cannot decipher.

Another advantage of the first embodiment of the present invention is an automatic close. Upon closing the door having the latch where the door is swinging shut, a catch automatically directs the also-swinging latch upwards and over a front portion of the catch, whereupon as the door keeps swinging closed the latch falls by gravity into the catch.

Another advantage of the first embodiment of the present invention is that some amount of power is required to pivot open the latch. The latch or pivoting member has a pivot axis that is disposed closer to the proximal end than the distal end. The distal end is the end of the latch that is caught by the catch. The proximal end of the latch includes a finger receptor or finger tab. By pushing down on the finger tab, the distal end of the latch is raised out of the catch, whereupon the door may be opened. However, by mounting the finger tab close to the pivot axis, some amount of power is required to raise the latch. The further the finger tab is mounted from the pivot axis, the more leverage gained and the less power required. The closer the finger tab is mounted from the pivot axis, the less leverage gained and the more power required, and this is preferred. Persons have a relatively great amount of power with their fingers. Dogs, cats and birds have relatively less power with their appendages poking through a wire crate, about a mounting plate, and downwardly to the finger tab.

Another advantage of the first embodiment of the present invention is that the latch is user friendly. The latch has a protruding finger tab that attracts attention and signals its use as a finger tool by having a slight U-shape or dip therein. The pivot axis is in plain sight to communicate to the user that the latch pivots. This information, taken together, readily indicates to the user how the latch moves—that the latch pivots.

Another advantage of the first embodiment of the present invention is that opening the door of the wire crate can be a one-handed operation. The four fingers of a user's left hand can grab the wire of the wire door to the left of the proximal end of the latch and then the user can operate the swingable latch with her left thumb. Or the four fingers of a user's right hand can engage the wire of the wire door below the proximal end of the latch and then the user can operate the swingable latch with her right thumb.

Another advantage of the first embodiment of the present invention is that opening of the latch is a three step process: 1) the latch is raised, and 2) the latch is maintained at its raised position while 3) the door is swung open.

Another advantage of the first embodiment of the present invention is that it is easy and inexpensive to manufacture.

An advantage of the second embodiment of the present invention is that a pair of back plates guard against operation of the latch from inside of the wire crate by a pet. For example, the sliding member is shielded from the inside of the wire crate by a back plate. Further, the catch includes a back plate or back member that shields a proximal end of the sliding member from the inside of the cage. The sliding member in its normally closed position confronts the back plate or back member of the catch. The back plate or back member of the catch minimizes the chances that a paw will push against the proximal end of the sliding member and push the sliding member out of engagement with the catch.

Another advantage of the present invention is an automatic close. The proximal end of the sliding member will be pushed against the bias of the sliding member when the proximal end hits an oblique portion of the catch. Then, when the proximal end clears the free end of the oblique portion, the bias of the sliding member will reverse direction of sliding and push the proximal end of the latch under the catch. Manual operation of the sliding member in either direction is not required. However, the sliding member may be manually operated if desired.

Another advantage is the first and second pair of double stops. A first pin slides in first slot and stops sliding when it hits a first end of the first slot. A second pin slides in a second slot and stops sliding when it hits the first end of the second slot at the same time that the first pin hits the first end of the first slot. The hit or stop force upon each pin is thus reduced in half, thereby minimizing pin breakage and minimizing wear and tear against the first end of the first slot and the first end of the second slot. Likewise, in the other sliding direction, the first pin stops sliding when it hits a second end of the first slot and the second pin stops sliding when it hits the second end of the second slot. The first and second pins hit the second end of the respective slots at the same time such that, again, a hit or stop force is reduced in half, thereby minimizing the chances that a pin will break and minimizing wear and tear upon the second ends of the slots.

Another advantage is that the front surface of the sliding member immediately communicates to a user where to place a finger on the sliding member to slide the sliding member to an open position. The shape of the front surface of the sliding member is simple with only one transverse wall against which a finger can push.

Another advantage of the present invention is that the sliding member can be held shut with a relatively great amount of force. One factor contributing to this advantage is that the sliding member is lightweight. The sliding member is made lightweight by forming two cavities therein. With a lighter sliding member, a coil spring with a given force of expansion can hold the sliding member in a closed position with a greater force than can the same coil spring acting upon a heavier latch.

Another advantage of the second embodiment of the present invention is that it is easy and inexpensive to manufacture.

DESCRIPTION

Figure 1:
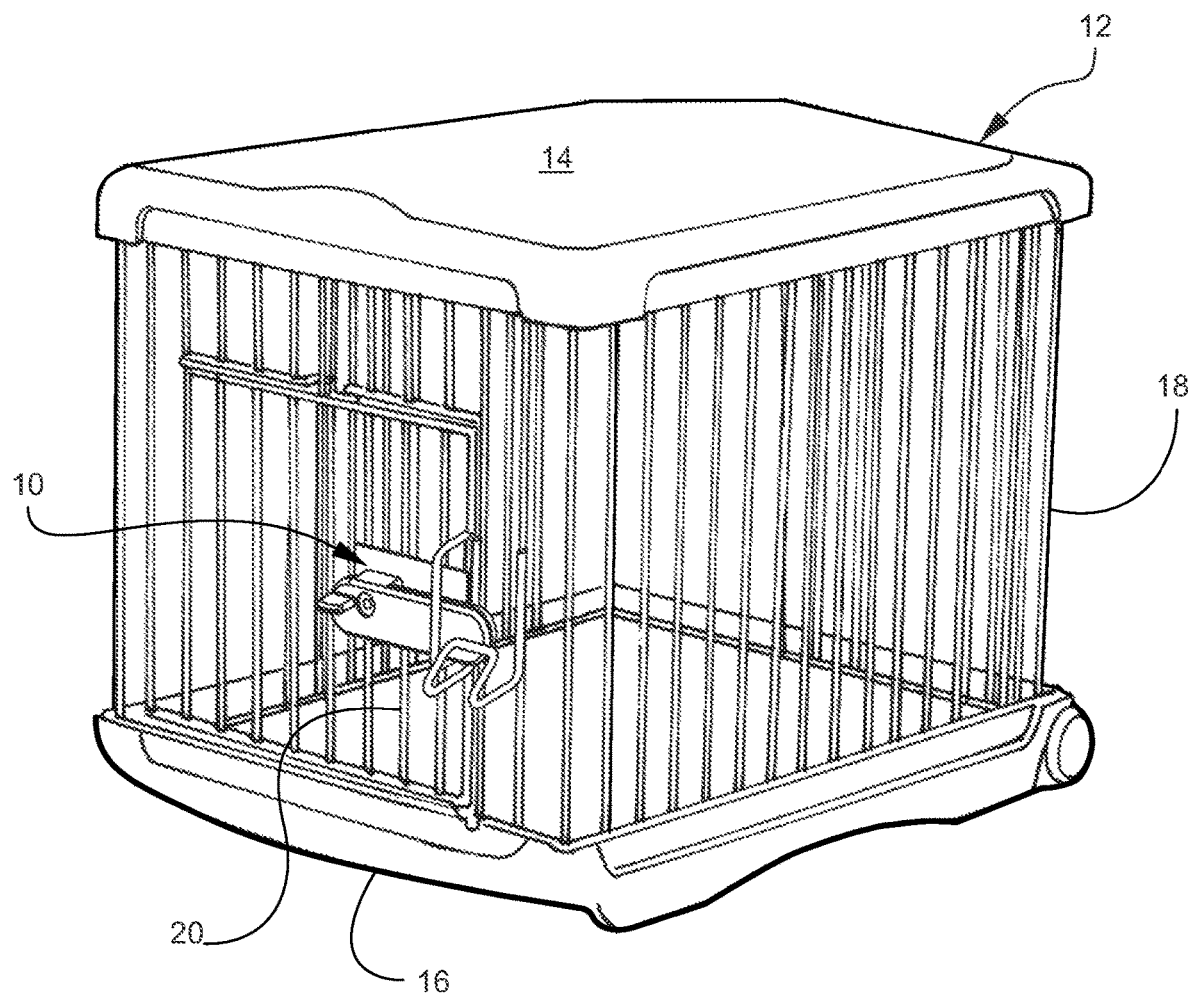
FIG. 1 is a perspective view of a first embodiment of a latch apparatus, namely, a pivoting deflecting gravity drawn latch apparatus on a wire crate having four wire sides and a solid top and bottom.

The present pivoting deflecting gravity drawn latch apparatus is indicated in general by the reference numeral 10 in FIG. 1 where the latch apparatus 10 is on a wire crate 12. Latch apparatus 10 is a first embodiment of the present invention.

Wire crate 12 includes a removable solid top 14, a removable solid bottom 16, and a cage 18. Cage 18 includes four sides having elongate members or wires or posts. Cage 18 can be a wire network if desired. Wire crate 12 further includes a door 20 in the front side of the pet crate 12. The door 20 is swingably opened and swingably closed. A portion of the latch apparatus 10 is mounted on the door 20 and another portion of the latch apparatus 10 is mounted on a door frame or non-door section of the front side of the cage 18.

Figure 2:
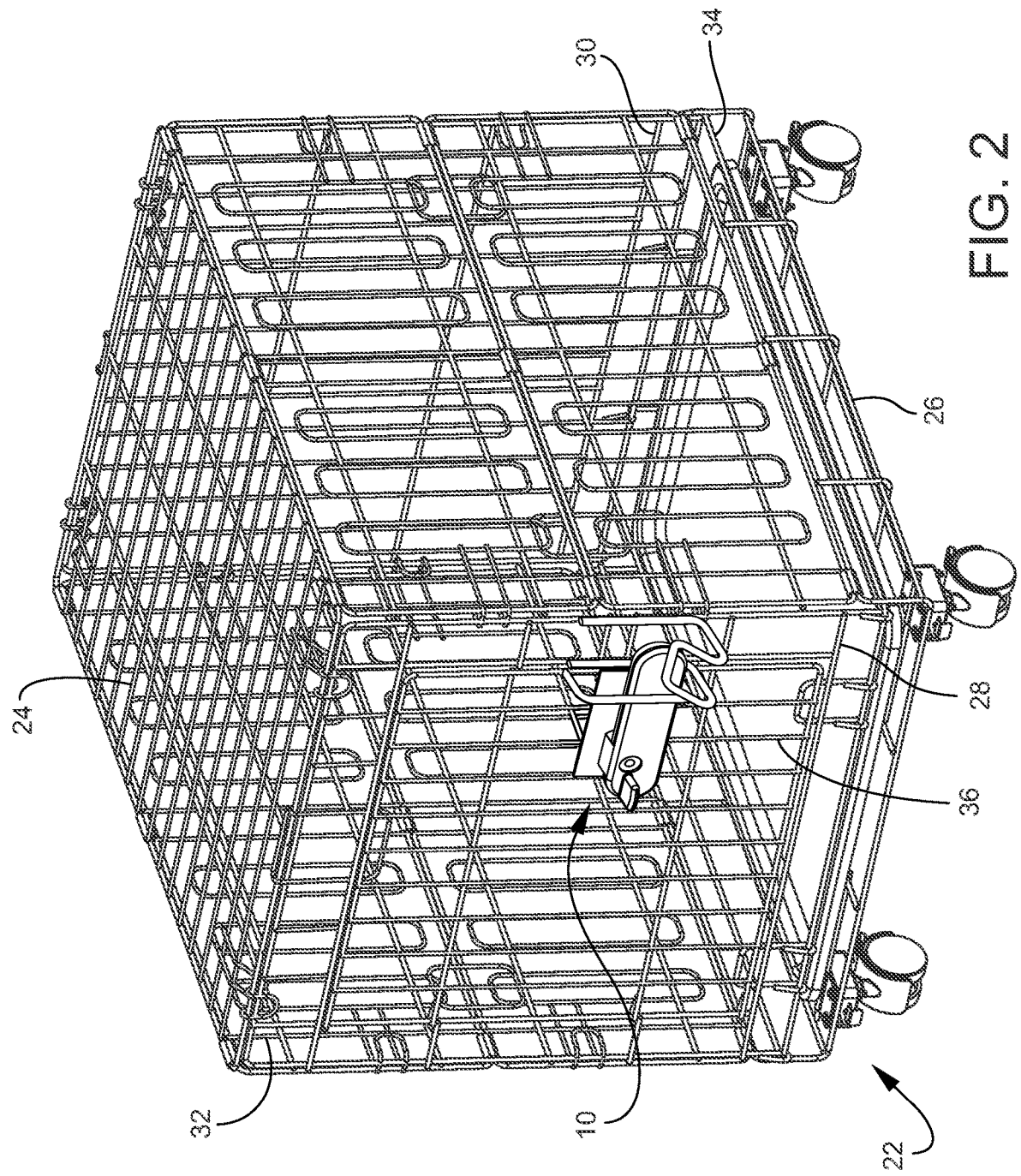
FIG. 2 is a perspective view of the pivoting deflecting gravity drawn latch apparatus of FIG. 1 on a wire crate having six wire sides, including a wire top and bottom.

FIG. 2 shows the latch apparatus 10 on a wire crate 22. Wire crate 22 includes six sides, with each of the six sides being formed by a network of wires. These six sides are a wire top 24, a wire bottom 26, a wire front side 28, a wire rear side 30, a wire right side 32 and a wire left side 34. The wire front side 28 includes a wire door 36. The door 36 is swingably opened and swingably closed. A portion of the latch apparatus 10 is mounted on the door 36 and another portion of the latch apparatus 10 is mounted on a door frame or non-door section of the wire front side 28 of the door 36.

Figure 3:
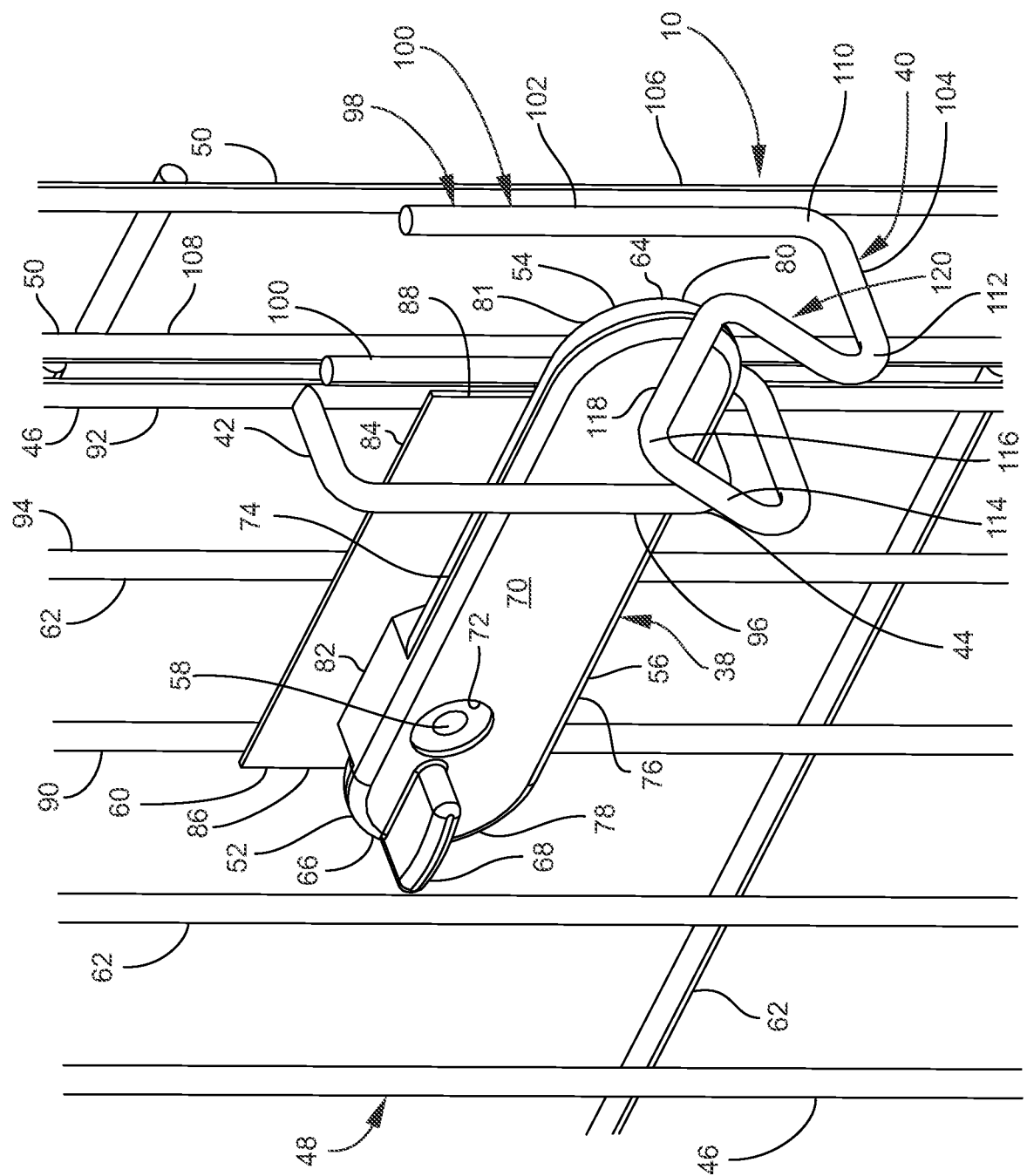
FIG. 3 is a detail perspective of the pivoting deflecting gravity drawn latch apparatus of FIG. 1 and shows a portion of a wire crate, where the wire crate is different from the wire crate of FIGS. 1 and 2.

Latch apparatus 10 is shown in detail in FIG. 3. Latch apparatus 10 includes a pivoting member 38, a catch 40, an upper stop 42, and a lower stop 44. Pivoting member 38 and the upper and lower stops 42, 44 are on a wire crate door 46 of a wire crate 48. Catch 40 is on a door frame 50 of the wire crate 48. Door 46 may be referred to as a first relatively swingable piece and the remaining portion of the wire crate 48 or door frame 50 may be considered to be a second relatively swingable piece.

Pivoting member or latch 38 includes a proximal end 52, a distal end 54, and an intermediate section 56 between the proximal and distal ends 52, 54. Pivoting member 38 defines a first plane and the distal end 54 of the pivoting member pivots up and down in this first plane. Pivoting member includes a pivot pin 58 that defines a pivot axis about which the pivoting member 38 pivots. Pivot pin 58 engages pivoting member 38 and is in turn engaged to a plate 60 that in turn is engaged to a network 62 of wires of the door 46. The pivot pin 58 is engaged to the intermediate section 56 of the pivoting member 38.

The distal end 54 is spaced further from the pivot pin 58 defining the pivot axis than the proximal end 52. The distal end 54 includes an absolute distal edge 64 and the proximal end 52 includes an absolute proximal edge 66. The absolute distal edge 64 is spaced further from the pivot pin 58 defining the pivot axis than the absolute proximal edge 66.

Pivot pin 58 is journaled in the pivoting member 38 such that pivoting member 38 is free swinging and such that the distal end 54 of the pivoting member 38 falls by gravity after being swung to an up or upward position. The portion of the pivoting member 38 extending from the pivot pin 58 to the distal end 54 is of greater mass and includes a greater weight than does the portion of the pivoting member 38 extending from the pivot pin 58 to the proximal end 52.

The portion of the pivoting member 38 extending from the pivot pin 58 to the proximal end 52 includes a finger receptor or tab 68. Finger tab 68 may or may not be molded integrally with pivoting member 38. Finger tab 68 extends at a right angle from the plane defined by the swinging of pivoting member 38. Finger tab 68 extends at a right angle from a front surface 70. Pivot pin 58 is recessed into the pivoting member 38 and relative to the front surface 70. Pivot pin 58 is set in an opening 72 formed in the pivoting member 38. Finger tab 68 runs from a location adjacent to the opening 72 to a location adjacent to the absolute proximal edge 66 of the proximal end 52. Finger tab or receptor 68 includes a dip formed therein for reception of a finger such as the first finger. This dip communicates to the user that the structure 68 is to be used by a finger. Finger tab 68 may be described as being U-shaped. This U-shape has the opening of the "U" opening upwardly. The "U" is not an inverted "U."

The finger tab 68 is mounted adjacent to the pivot axis defined by the pivot pin 58 for a number of reasons. For example, such a location minimizes the length of the pivoting member 38. Such a location maximizes the power necessary to swing the distal end 54 up and out of the catch 40 and makes it more difficult for an animal to effectuate pivoting. A location further away from the pivot axis defined by the pivot pin 58 increases the leverage for such an upward swinging and makes it easier with less power for such an upward swinging, and therefore makes it easier for an animal such as a pet to swing the distal end 54 out of the catch 40.

The body of the pivoting member 38 is defined by a pair of upper and lower parallel edges 74, 76, further by a rounded proximal edge 78, and still further by a rounded distal edge 80. Each of the upper and lower parallel edges 74, 76 leads into the rounded proximal edge 78. Each of the upper and lower parallel edges 74, 76 leads into the rounded distal edge 80. The perimeter of the pivoting body 38 includes a radius. In other words, the front and rear surfaces of the pivoting body 38 are chamfered to provide an oblique face 81. This oblique face or surface, chamfer, radius, or curvature 81 extends from the front surface to the rear surface of the pivoting body 38, and runs about the entire perimeter except where the pivot pin block 82 extends from the rear of the pivoting member 38. Pivot pin block 82 may be integral with and molded with the pivoting member 38. Pivot pin block 82 provides a thicker portion for the pivoting member 38, where this thicker portion can better hold and retain pivot pin 58. Chamfer or oblique surface 81, particularly the oblique face or chamfer 81 extending from the rear surface of the pivoting member 38 to the lower edge 76 of the pivoting member 38, aids in a smooth lifting of the distal end 54 of the pivoting member 38 when the distal end 54 hits the catch 40 when the door 46 is being swung closed. Chamfer 81 includes, or runs adjacent to, the upper and lower edges 74, 76 of the pivoting member 38.

Figure 4:
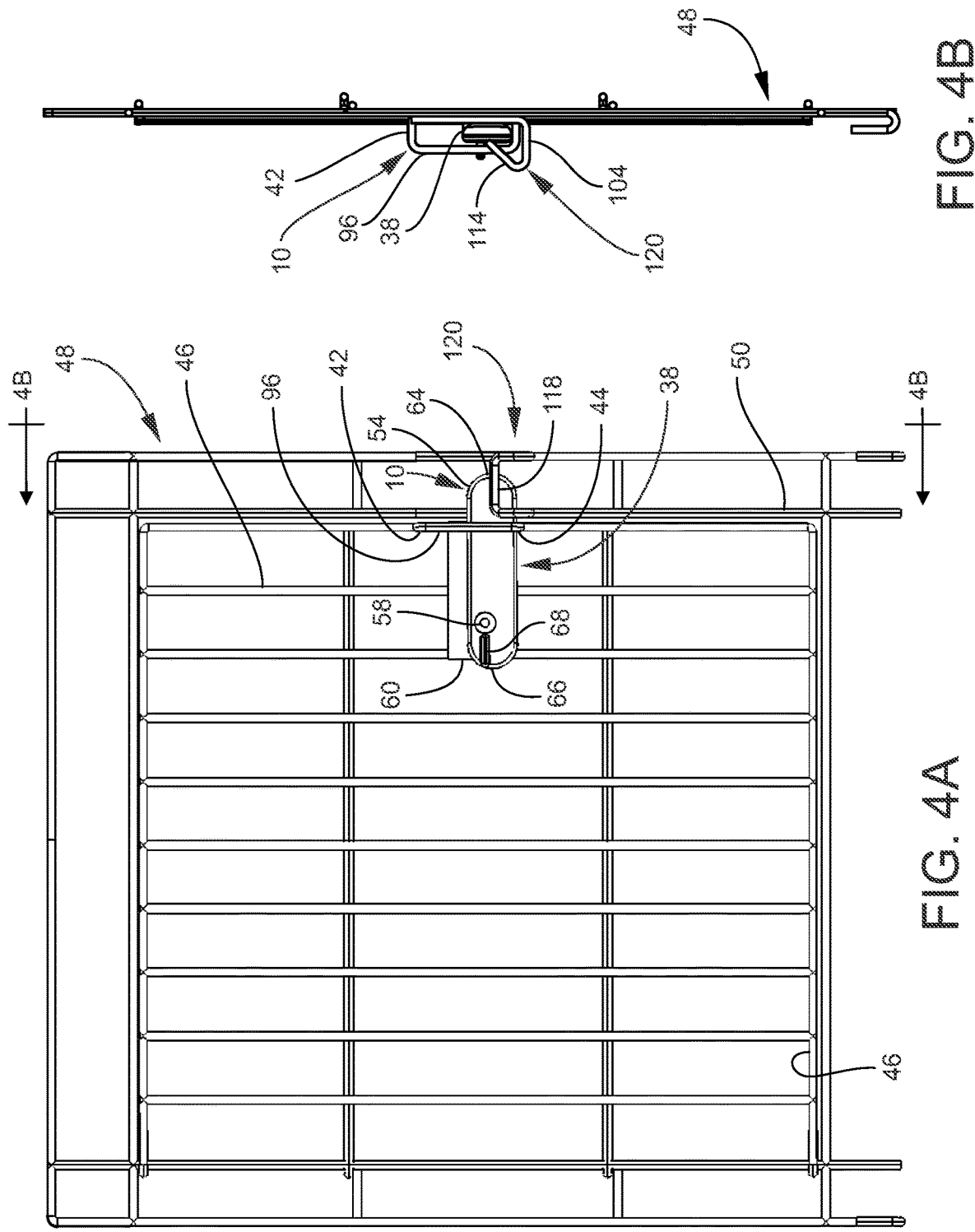
FIG. 4A is a front plan view of the pivoting deflecting gravity drawn latch apparatus of FIG. 1 and shows a portion of a wire crate, where the wire crate is the same as the wire crate of FIG. 3.
FIG. 4B is a side view of the pivoting deflecting gravity drawn latch apparatus of FIG. 1 at lines 4B-4B of FIG. 4A.

Rounded proximal edge 78 includes a peak. Intersecting or at this peak is the absolute proximal edge 66. Rounded distal edge 80 includes a peak. Intersecting or at this peak is the absolute distal edge 64. These peaks define a longitudinal axis of the pivoting member 38. As shown in FIG. 4A, the pivot pin 58 defining the pivot axis of the pivoting member 38 is between this longitudinal axis and the upper edge 74 of the pivoting member 38. As shown in FIG. 4A, the finger tab 68 is between this longitudinal axis and the upper edge 74 of the pivoting member 38.

The rear of the body of the pivoting member 38 is flat except that the rear includes the pivot block 82 extending therefrom. The rear of the body of the pivoting member 38 is identical to the front of the body of the pivoting member 38 except that the rear of the body does not include a finger tab 68 and except that the rear of the body includes the pivot block 82. The pivot block 82 has an opening therein for reception of the pivot pin 58.

The pivoting member 38, including the finger tab 68 and pivot block 82, may be formed of metal or plastic.

Plate 60 may be metal or plastic. Plate 60 may be a sheet plate. Plate 60 is formed in the shape of a square or rectangle. Plate 60 includes a horizontal upper edge 84. Horizontal upper edge 84 is spaced from and is above the upper edge 74 of the pivoting member 38 to deny to an animal inside of the wire crate 48 access to the pivoting member 38 and the finger tab 68. Horizontal upper edge 84 and pivoting member edge 74 run parallel to each other when the pivoting member 38 is at rest. Horizontal upper edge 84 runs between a vertical proximal edge 86 of the plate 60 and a vertical distal edge 88 of the plate 60. Vertical proximal edge 86 confronts, is adjacent to, and is mounted on a vertical wire support member or vertical wire 90 of the wire network 62. Distal end 52 of the pivoting member 38 extends beyond the vertical proximal edge 86 of plate 60. Vertical distal edge 88 confronts, is adjacent to, and is mounted on the outer end of the swinging door 46. This outer end of the swinging door 46 includes a vertical wire or vertical wire support member 92 of the wire network 62 and the vertical distal edge 88 is mounted on vertical wire support member 90. Vertical distal edge 88 of plate 60 runs between upper and lower stops 42, 44. Upper edge 84 of plate 60 is spaced from upper stop 42. A lower horizontal edge of plate 60 runs to and between the vertical edges 86 and 88 of plate 60. This lower horizontal edge confronts and is adjacent to the lower stop 44. Plate 60 is mounted, such as by welding, on distal end wire 92, proximal end wire 90, and an intermediate wire 94. Plate 60 is rigid. Pivot pin 58 extends through plate 60. Pivot block 82 has a rear flat face and the front face of plate 60 is flat to minimize wobble of the pivoting member 38. Pivot block 82 spaces the body of the pivoting member 38 from the plate 60 to minimize surface contact between the body of the pivoting member 38 and the plate 60 so as to maximize a free swinging of the pivoting member 38 and so as to maximize the responsiveness of the distal end 54 of the pivoting member 38 to gravity.

Latch apparatus 10 further includes the upper and lower stops 42, 44. Extending between the outer ends of the stops 42, 44 is a traversing member 96. Stop 42, 44 and traversing member 96 act as one-piece to contain the distal end 54 of the pivoting member 38. Upper stop 42 extends horizontally and outwardly from wire 92. Traversing member 96 extends from the outer end of upper stop 42 downwardly and vertically. Lower stop 44 extends from the lower end of traversing member 96 inwardly and horizontally and back to wire 92. Stops 42, 44 and traversing member 96 form a U-shape. Wire 92 forms a portion of the door 46 and thus upper and lower stops 42, 44 are on the door 46. Upper and lower stops 42, 44 and traversing member 96 form a rigid, integral piece. Upper stop 42 stops upward travel of the distal end 54 of the pivoting member 38. The upper edge 74 of the pivoting member 38 hits the upper stop 42. The lower stop 44 stops downward travel of the distal end 54 of the pivoting member 38. The lower edge 76 of the pivoting member 38 hits the lower stop 44. The lower edge 76 of the pivoting member 38 rests on the lower stop 44 when the pivoting member 38 is at a rest position in the catch 40 or when the pivoting member 38 is at a rest position outside of the catch 40.

Traversing member 96 and the plate 60 may be referred to as side stops because they contain and prevent excessive bending or turning of pivoting member 38 on a vertical axis. For example, an animal may push outward against the distal end 54 of the pivoting member 38. Or the animal may draw in with his or her paw or claw the distal end 54 of the pivoting member 38. The first resistance against such an outward pushing or an inward drawing is the pivot pin 58 and its connections with the body of the pivoting member 38, the pivot block 82 and the plate 60.

Traversing member 96 in normal operation is spaced from the outer face 70 of the pivoting member 38 such that pivoting member 38 can easily swing with minimal resistance. Plate 60 in normal operation is spaced from the inner face of the pivoting member 38 such that pivoting member 38 can easily swing with minimal resistance.

Figure 5:
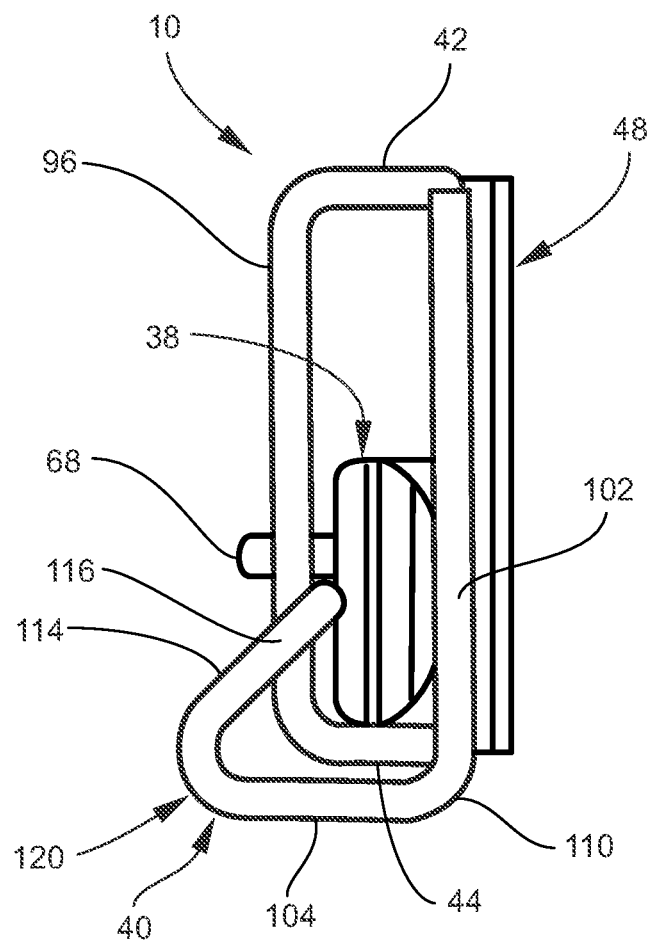
FIG. 5 is a detail side view of the pivoting deflecting gravity drawn latch apparatus of FIG. 1, showing the latch apparatus from the same perspective as FIG. 4B.

Latch apparatus 10 includes the catch 40. Catch 40 includes a base 98 formed by two identical L-shaped wire portions 100. Each of the L-shaped wire portions 100 includes a straight vertical wire section 102 and a straight horizontal wire section 104. Straight vertical wire section 102 is mounted, such as by welding, on the door frame 50. In wire crate 48, door frame 50 includes spaced apart vertical wires 106, 108. One vertical wire section 102 is mounted on one vertical wire 106 and the other vertical wire section 102 is mounted on vertical wire 108. The upper ends of the vertical wire sections 102 are disposed at the height of the upper stop 42. The lower ends of the vertical wire sections 102 are disposed at about the height of the lower stop 44, as shown in FIG. 5.

The straight vertical wire section 102 transitions through a curved transition wire section 110 into horizontal wire section 104. The upper surface of the horizontal wire section 104 is at a lower height than the upper surface of the lower stop 44 such that the lower edge 76 of pivoting member 38 rests on the lower stop 44 in the rest position and not upon the horizontal wire section 104.

The outer end of the horizontal wire section 104 transitions through a curved transition wire section 112 into an oblique wire section 114. Wire section 114 is straight and disposed obliquely relative to the horizontal straight wire section 104. Wire section 114 is also oblique relative to the plane in which the pivoting member 38 swings. Wire section 114 extends, from its lower end, upwardly and inwardly.

The upper end of oblique wire section 114 transitions through a curved transition wire section 116 into cross member 118. There is one cross member 118. Cross member 118 ties together the wire sections 102, 110, 104, 112, 114, and 116, each of which is paired with a respective twin wire section 102, 110, 104, 112, 114 and 116. Base 98 may be integral and one-piece and formed from one piece of wire. Sections 112, 114, 116 and 118 make up an oblique member 120, as each of these wire sections includes an oblique surface that directs or deflects the distal end 54 of the pivoting member 38 up and over the catch 40 and further into the catch 40 between the cross member 118 and the upright wire section 102 that confronts the upper and lower stops 42, 44.

The distal end 54 of the pivoting member 38 in the rest position is disposed behind the cross member 118 and in front of the vertical wire section 102 that is adjacent to the upper and lower stops 42, 44.

The distal end 54 of the pivoting member 38 in the rest position is disposed between the vertical wire sections 102. Each of the vertical wire sections 102 defines an end of the catch 40 such that the distal end 54 of the pivoting member 38 in the rest position is between the ends of the catch 40.

Figure 6C:
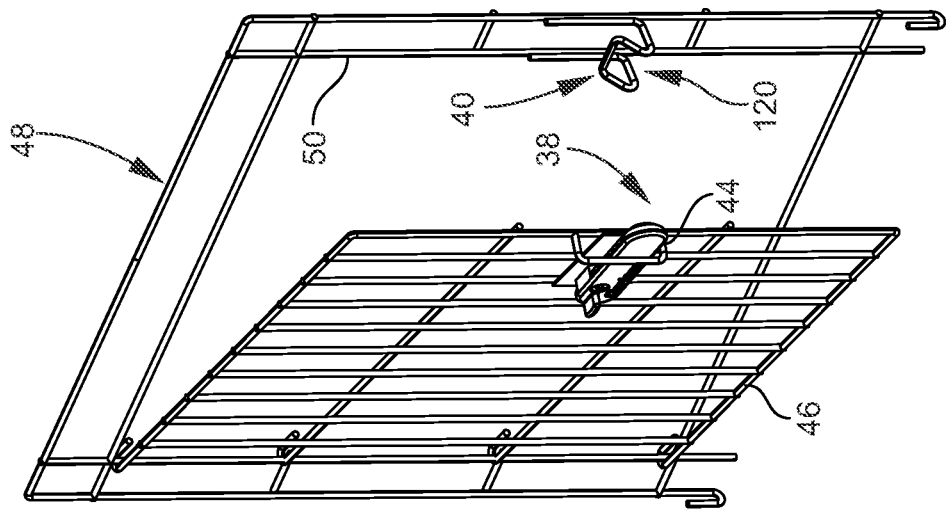
FIG. 6C is a perspective view of the pivoting deflecting gravity latch apparatus and wire crate portion of FIG. 6B, but with the latch apparatus having fallen under the influence of gravity after the wire crate door has been opened.
Figure 6B:
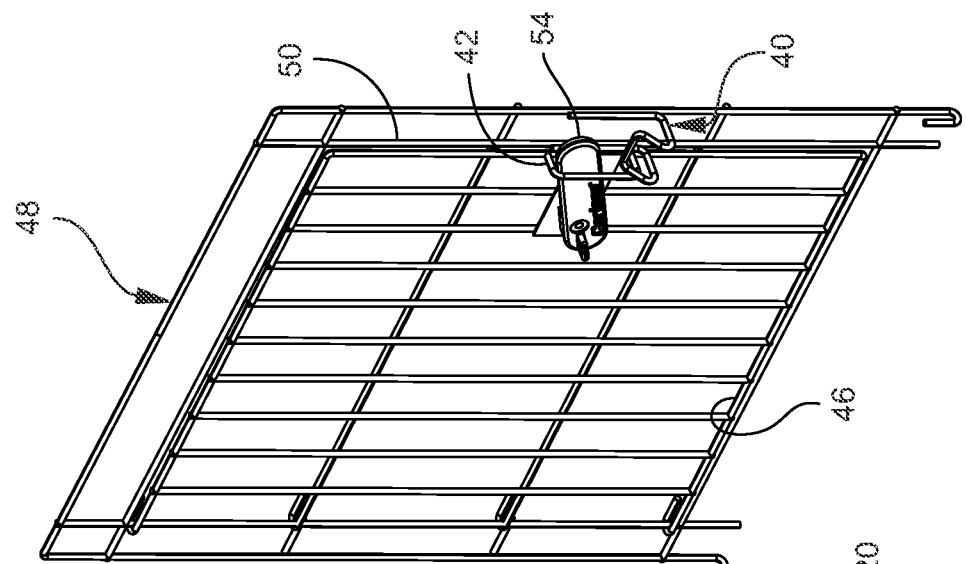
FIG. 6B is a perspective view of the pivoting deflecting gravity latch apparatus and wire crate portion of FIG. 6A, but with the latch apparatus having been pivoted upwardly.
Figure 6A:
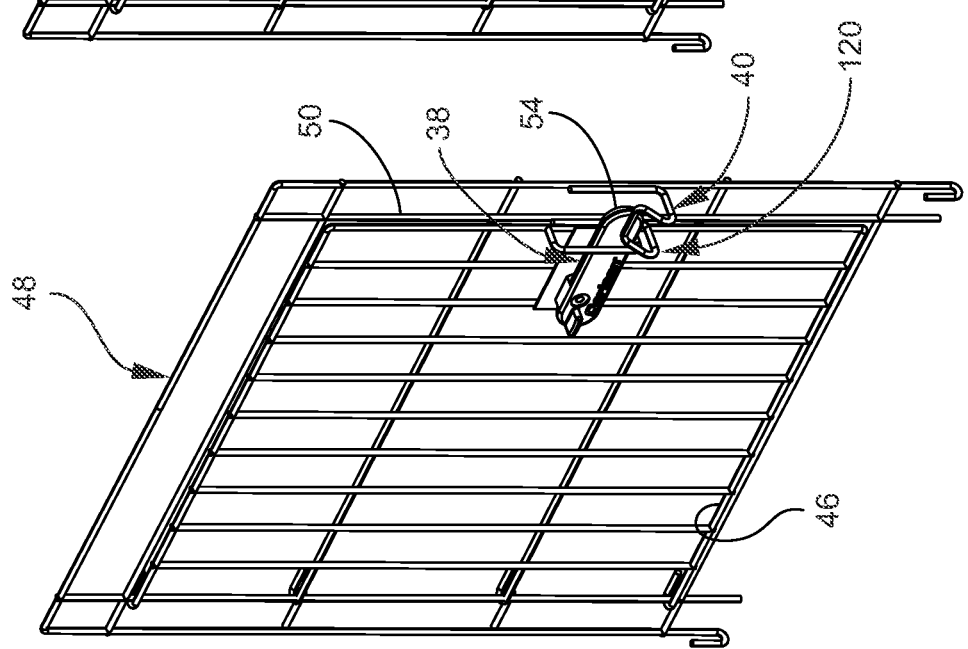
FIG. 6A is a perspective view of the pivoting deflecting gravity latch apparatus of FIG. 1, shows the same portion of the wire crate as shown in FIG. 4A, and shows the wire crate door in a closed position.

In operation, as shown in FIG. 6A, pivoting member 38 is in a rest position. The pivoting member 38 is resting upon the lower stop 44, above the horizontal wire sections 104 of the catch 40. The distal end 54 of the pivoting member 38 is in the catch 40, behind the cross member 118, in front of the vertical wire section 102 that is adjacent to the upper and lower stops 42, 44, and between the ends of the catch 40, i.e., between the vertical wire sections 102.

Then, as shown in FIG. 6B, to open the door 46, the finger tab 68 is pushed down, which lifts up the distal end 54 of the pivoting member 38 beyond the cross member 118. The rotation of the distal end 54 of the pivoting member 38 is limited by the upper stop 42.

Then, while still pushing down on the finger tab 68, the door 46 is swung open. The steps of pushing down on the finger tab 68, holding down the finger tab 68, and swinging open the door 46 may be accomplished with one hand, such as where the left thumb operates the finger tab 68 and the remainder of the left hand pulls on the wire network 62 of the door 46. The finger tab 68 is released, whereupon the pivoting member 38 swings by gravity to the rest position on the lower stop 44.

Figure 7C:
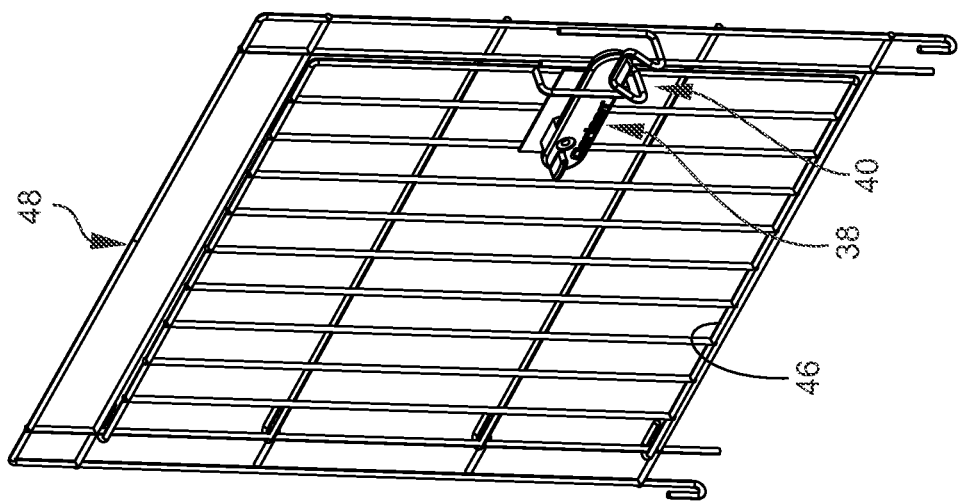
FIG. 7C is a perspective view of the pivoting deflecting gravity latch apparatus and wire crate portion of FIG. 7B, but with the wire crate door having been completely swung closed and with the pivoting member of the latch apparatus having fallen under the influence of gravity into the catch of the latch apparatus after the wire crate door has been closed.
Figure 7B:
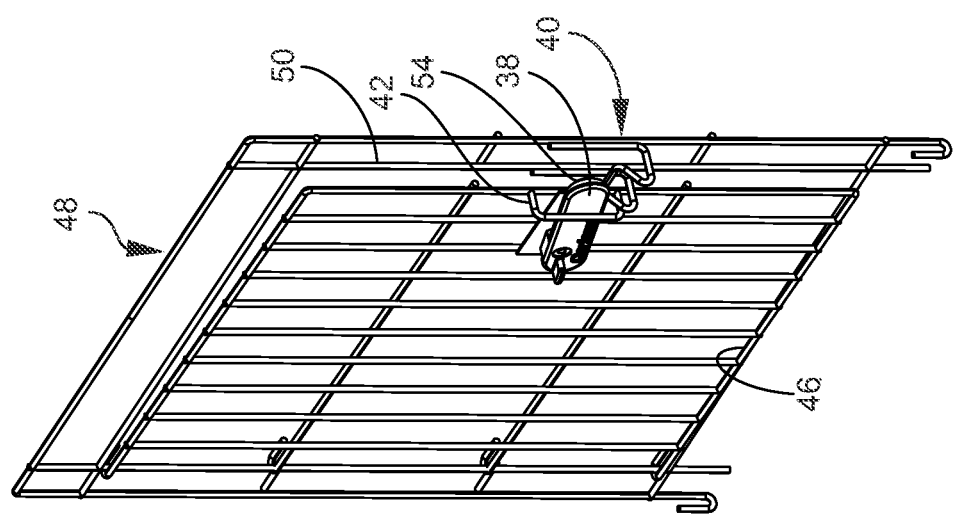
FIG. 7B is a perspective view of the pivoting deflecting gravity latch apparatus and wire crate portion of FIG. 7A, but with the wire crate door being in the process of swinging closed and the oblique portion of the catch of the latch apparatus being in the process of deflecting the pivoting member of the latch apparatus upwardly and into the catch.
Figure 7A:
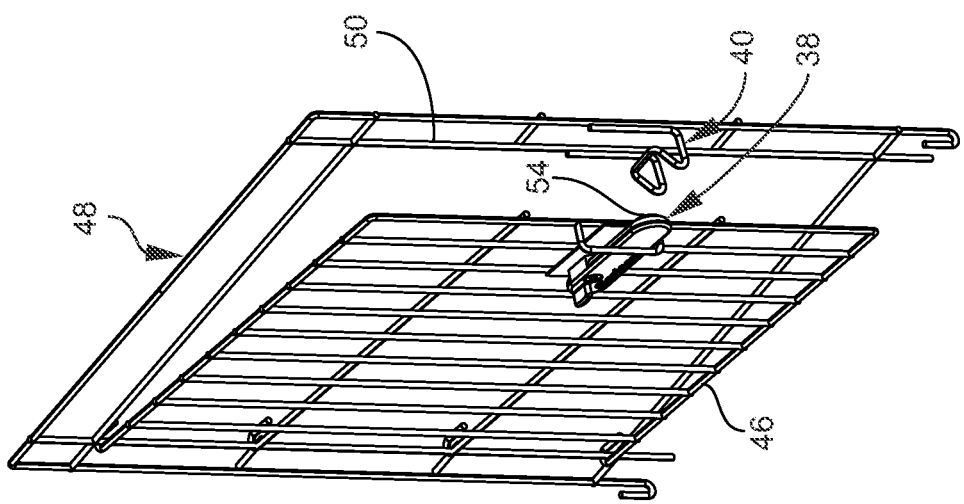
FIG. 7A is a perspective view of the pivoting deflecting gravity latch apparatus of FIG. 1, shows the same portion of the wire crate as shown in FIG. 4A, and shows the wire crate door in an open position.

Then, as shown in FIG. 7A, to close the door 46, the door 46 is simply swung shut. No manipulation of the pivoting member 38 is required. The door 46 is swung shut with the pivoting member 38 in its rest position on the lower stop 44.

As shown in FIG. 7B, the distal end 54 will hit the oblique member 120. More precisely, the chamfer or radius that extends between the rear surface of the pivoting member 38 and lower edge 76 of the pivoting member 38 hits one or more of the oblique surfaces of wire sections 112, 114 and 116. Such an action pivots the distal end 54 of the pivoting member 38 upwardly and over the catch 40.

Then, as shown in FIG. 7C, once the lower edge 76 of the pivoting member 38 clears wire sections 114, 116 and 118, the pivoting member 38 drops down into the catch 40 to the rest position on the lower stop 44. The pivoting member 38 falls into the catch 40 under the influence of gravity.

A second embodiment of the latch apparatus, a latch apparatus 200, is shown in FIGS. 8 to 14.

Figure 8:
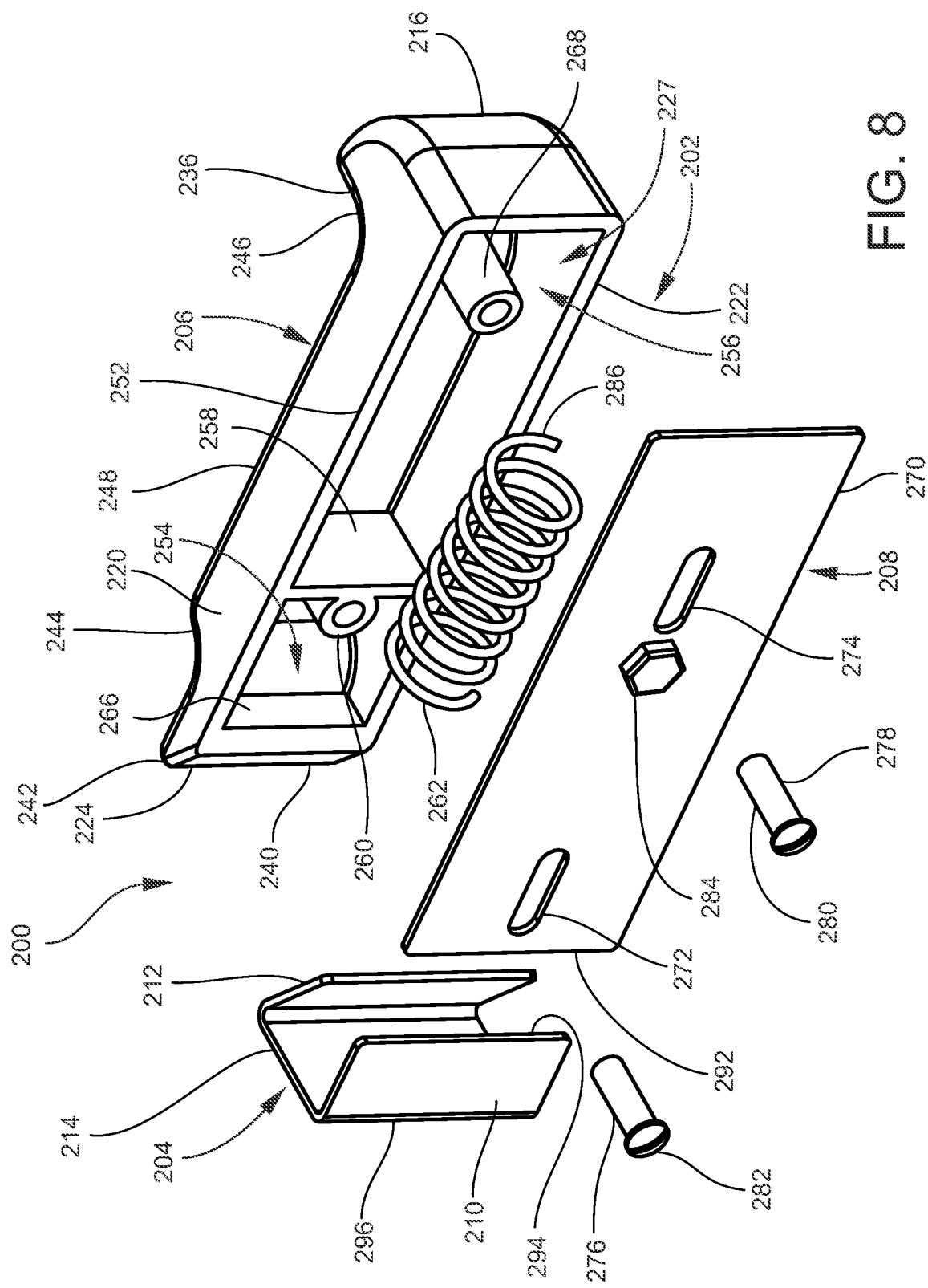
FIG. 8 is a perspective, broken apart, rear view of a second embodiment of a latch apparatus, namely, a slideable latch apparatus that may be used on the wire crate of FIG. 1, or on the wire crate of FIG. 2, or with the wire crate wall section of FIG. 4A.
Figure 10:
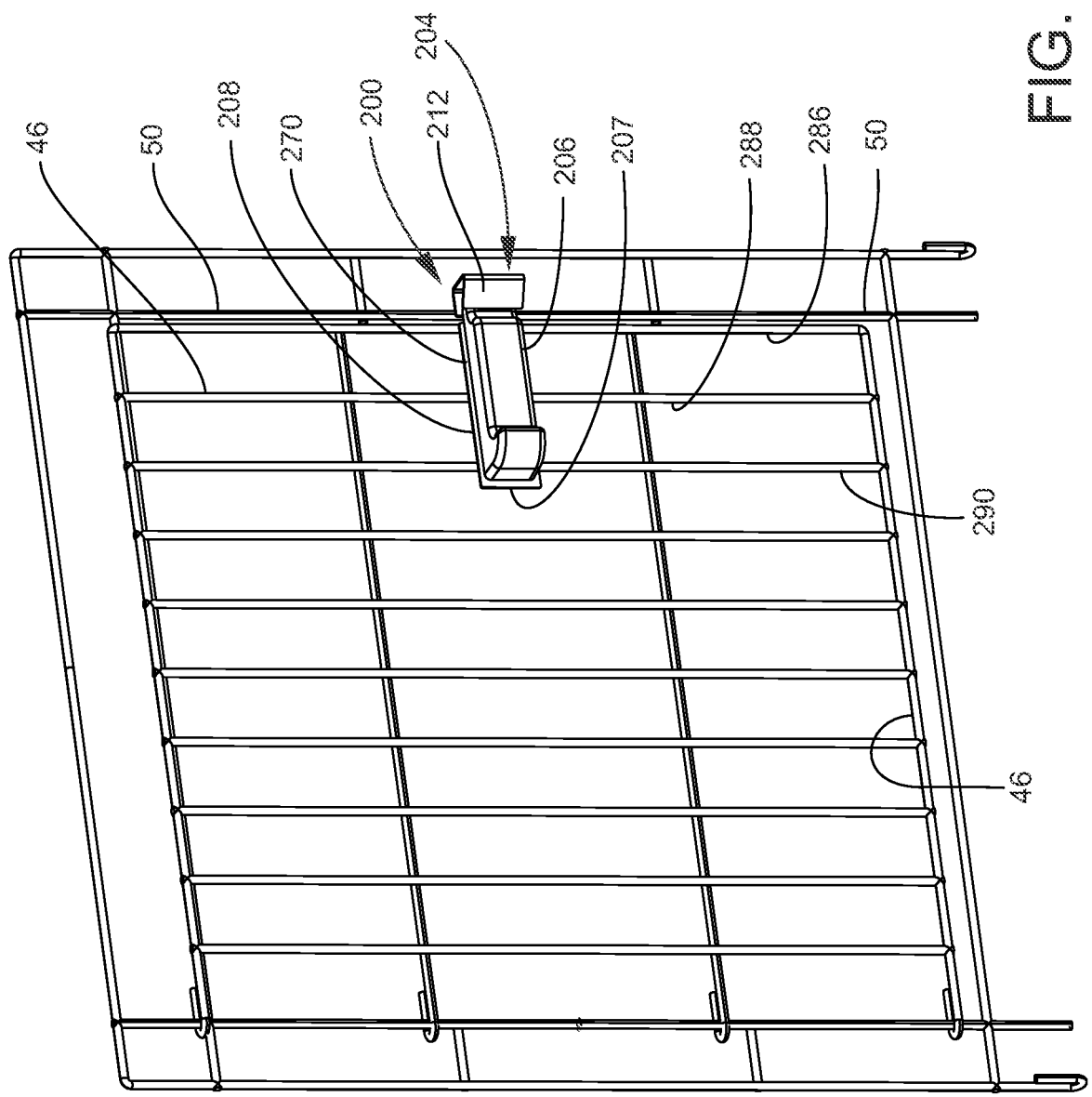
FIG. 10 is a front perspective view of the latch apparatus of FIG. 8 showing the sliding member latched to the catch and showing the door of the wire crate closed.

As shown in FIG. 8, latch apparatus 200 includes a latch 202 and a catch 204. The latch 202 includes a sliding member 206 and a back plate 208. The catch 204 includes a back plate or back member or back portion 210, an oblique front portion or oblique front member 212, and a transverse member or transverse portion 214 connecting the back portion 210 to the oblique front portion 212. As shown in FIG. 10, the back plate 208 of the latch 202 is engaged to door 46 and the back plate 210 of the catch 204 is engaged to the door frame 50 of the wire crate 48. Door 46 may be referred to as a first swinging piece. Wire crate 48 may be referred to as a second relatively swinging piece.

Figure 9:
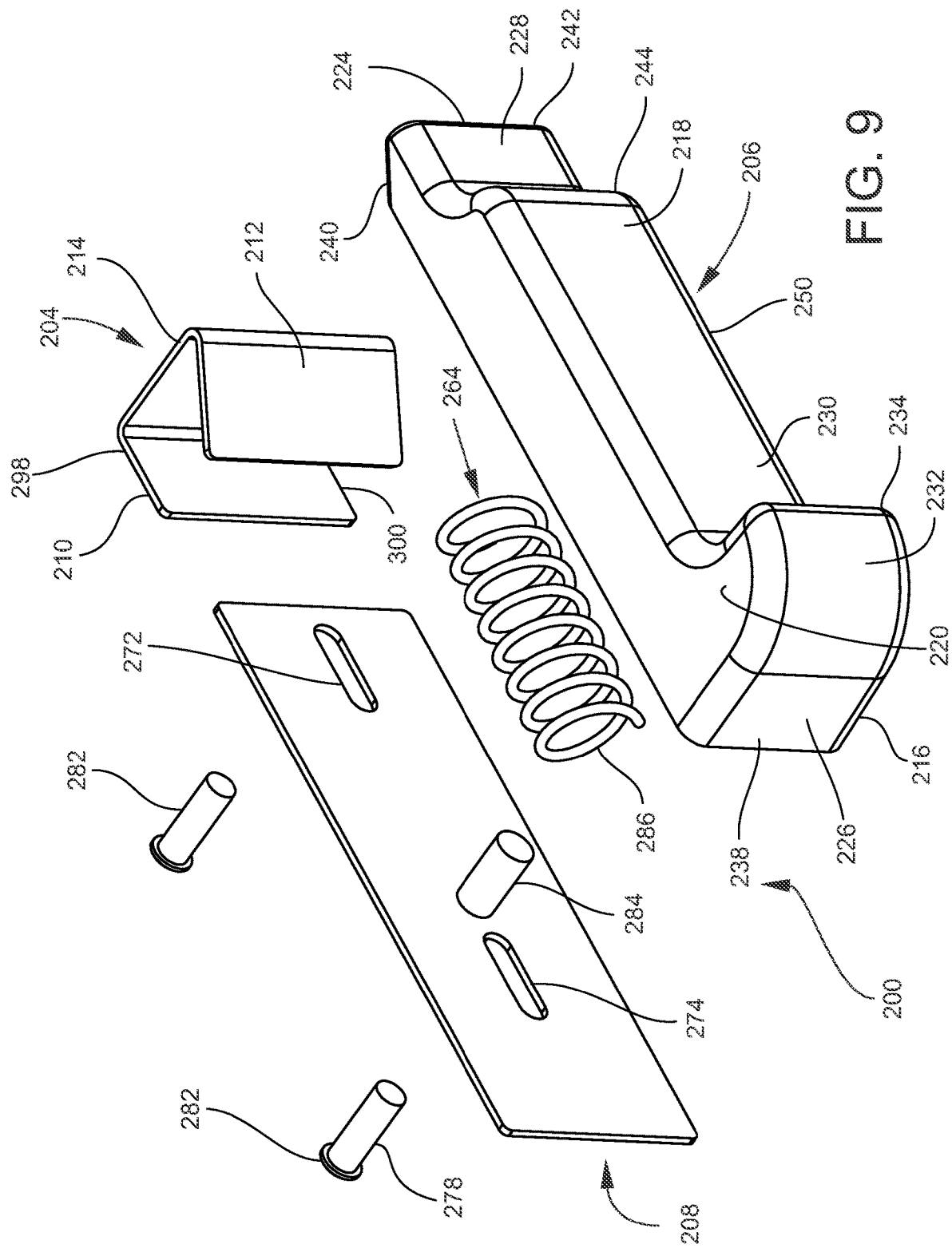
FIG. 9 is a perspective, broken apart, front view of the latch apparatus of FIG. 8.

As shown in FIGS. 8 and 9, sliding member 206 includes a body 216. Body 216 includes a front side 218, a top side 220, a bottom side 222, a proximal end 224, a distal end 226, and an open back side 227.

The front side 218 is stepped or includes steps. The front side 218 includes the proximal end 224 that includes a front proximal side section 228 that is spaced from back plate 208 by a first distance. The front side 218 includes an intermediate side section 230 running to and between the proximal end 224 and the distal end 226. The intermediate side section 230 is spaced from the back plate 208 by a second distance. The distal end 226 includes a curved side section 232 having a front most portion 234 that is spaced from the back plate 208 by a third distance. The first distance is less than the second distance which is less than the third distance. The front side 218 further includes a transverse wall or transverse member or transverse portion 236 that leads from the intermediate side section 230 to the peak or front most portion 234 of the distal end 226. Transverse wall 236 is transverse relative to the back plate 208 and relative to the intermediate section 230. Distal end 226 further includes an end section 238 that defines a plane and that leads into curved side section 232.

Proximal end 224 includes a rear oblique surface or side 240. Side 240 is oblique relative to front side section or proximal surface 228. Side 240 and front side section 228 meet at an edge 242. The purpose of oblique side 240 is to engage oblique front portion 212 of the catch 204 when the door 46 is being swung shut. The force of the door 48 being swung will translate into the sliding member 206 sliding in a direction from proximal end 224 to distal end 226.

Between proximal surface 228 and intermediate surface 230, front side 218 includes an undulating front side section 244.

Between intermediate surface 230 and the transverse wall 236, front side 218 includes a radius 246.

Between top side 220 and front side 218, body 216 includes a radius 248.

Between front side 218 and bottom side 222, body 216 includes a radius 250.

Top side 220 is flat and defines a plane. Top side 220 extends to and between the proximal end 224 and the distal end 226.

Bottom side 222 is flat and defines a plane. Bottom side 222 extends to and between the proximal end 224 and the distal end 226. Bottom side 222 extends parallel to top side 220.

Open back side 227 is defined by proximal end 224, distal end 226, top side 220 and bottom side 222. These portions of the body 216 form a rectangular perimeter 252 that further defines the open back side 227.

Open back side 227 is further defined by front side 218 that forms an inner front wall to the open back side 227.

Open back side 227 includes a first cavity 254 and a second cavity 256. The first and second cavities 254, 256 are separated by a transverse wall 258. Transverse wall 258 runs vertically to and between the top and bottom sides 220, 222 and further runs to the front side 218. On one side, transverse wall 258 serves as a mount for a cylinder 260 that runs in the transverse direction from the top side 220 to the open back side 227. On the other side, the transverse wall 258 serves as a stop or retainer for a proximal end 262 of a coil spring 264. The outer free edge of transverse wall 258 lies against the inner face of the back plate 208.

Perimeter 252 defines a plane. Perimeter 252 lies flat upon and slides against the inner face of the back plate 208. Back plate 208 defines a plane. The outer free edge of transverse wall 258 lies in the plane defined by perimeter 252.

First cavity 254 includes cylinder 260. The outer annular edge of cylinder 260 lies in the plane defined by perimeter 252 and against the inner face of back plate 208.

First cavity 254 is adjacent to proximal end 224 of sliding member 206. First cavity 254 is defined by an inner transverse wall 266, undulating section 244, intermediate side 230, transverse wall 258, top side 220, bottom side 222, and cylinder mount 260.

Second cavity 256 is defined by transverse wall 258, top side 220, bottom side 222, intermediate side 230, transverse wall 258, radius 246, curved side 232 and end section 238. Second cavity 256 is further defined by and includes a second cylinder or cylindrical pin mount 268. Second cylinder 256 runs transversely relative to back plate 208 and includes an outer open end that is in the plane defined by perimeter 252. Second cavity 256 contains or receives coil spring 264.

Figure 12:
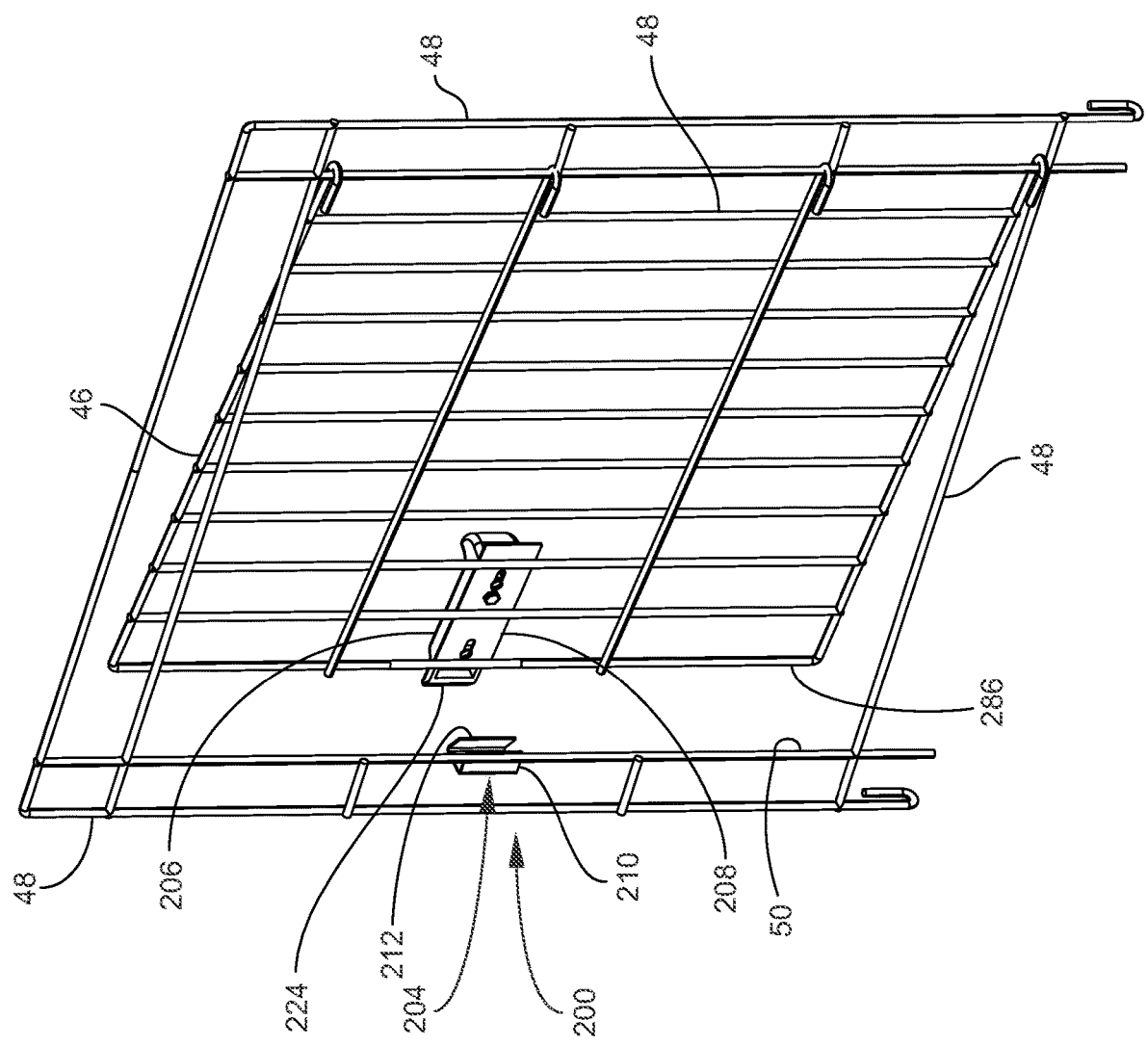
FIG. 12 is a rear perspective view of the latch apparatus of FIG. 8 showing the sliding member unlatched from the catch and showing the door of the wire crate open.

Back plate 208 includes a rectangular perimeter 270. As shown in FIG. 10, this rectangular perimeter 270 is greater in height (a distance from a bottom edge to a top edge) than is rectangular perimeter 252 of the sliding member 206. As shown in FIG. 12, the rectangular perimeter 270 has a width (a distance from one vertical edge to the other vertical edge) that runs from just proximal of cylinder 260 (about the middle of the width of first cavity 254) to beyond the distal end 226 of sliding member 206.

Back plate 208 includes a pair of first and second through slots 272, 274. Each of the slots 272, 274 has a proximal end and a distal end. The slots 272, 274 are aligned on a straight line toward the catch 204. The slots 272, 274 are on a horizontal axis.

First and second guide pins 276, 278 extend through slots 272, 274, respectively, and engage cylinders 260, 268, respectively. Each of the pins 276 has a cylindrical shaft 280 of lesser diameter than the height of each of the slots 272, 274. Each of the pins 276 have a head 282 of a greater diameter than the height of each of the slots 272, 274 such that pin heads 282 retain the sliding member 206 on the back plate 208 and, at the same time, permit the sliding member 206 to slide on or relative to the back plate 208.

Back plate 208 further includes an inwardly extending transverse post 284 affixed thereto. Post 284 extends into second cavity 256 and serves as a stop for a second end 286 of coil spring 264. Post 284 may extend sufficiently far into second cavity 256 to abut or confront or be adjacent to the inner face of intermediate side 230. Post 284 is affixed to the back plate 208 just proximal of the proximal end of the second slot 274.

Coil spring 264 brings pressure to bear upon transverse wall 258 and post 284. Coil spring 264 is contained in second cavity 256 by transverse wall 258, post 284, intermediate side 230, top side 220, bottom side 222, and back plate 208.

Figure 13:
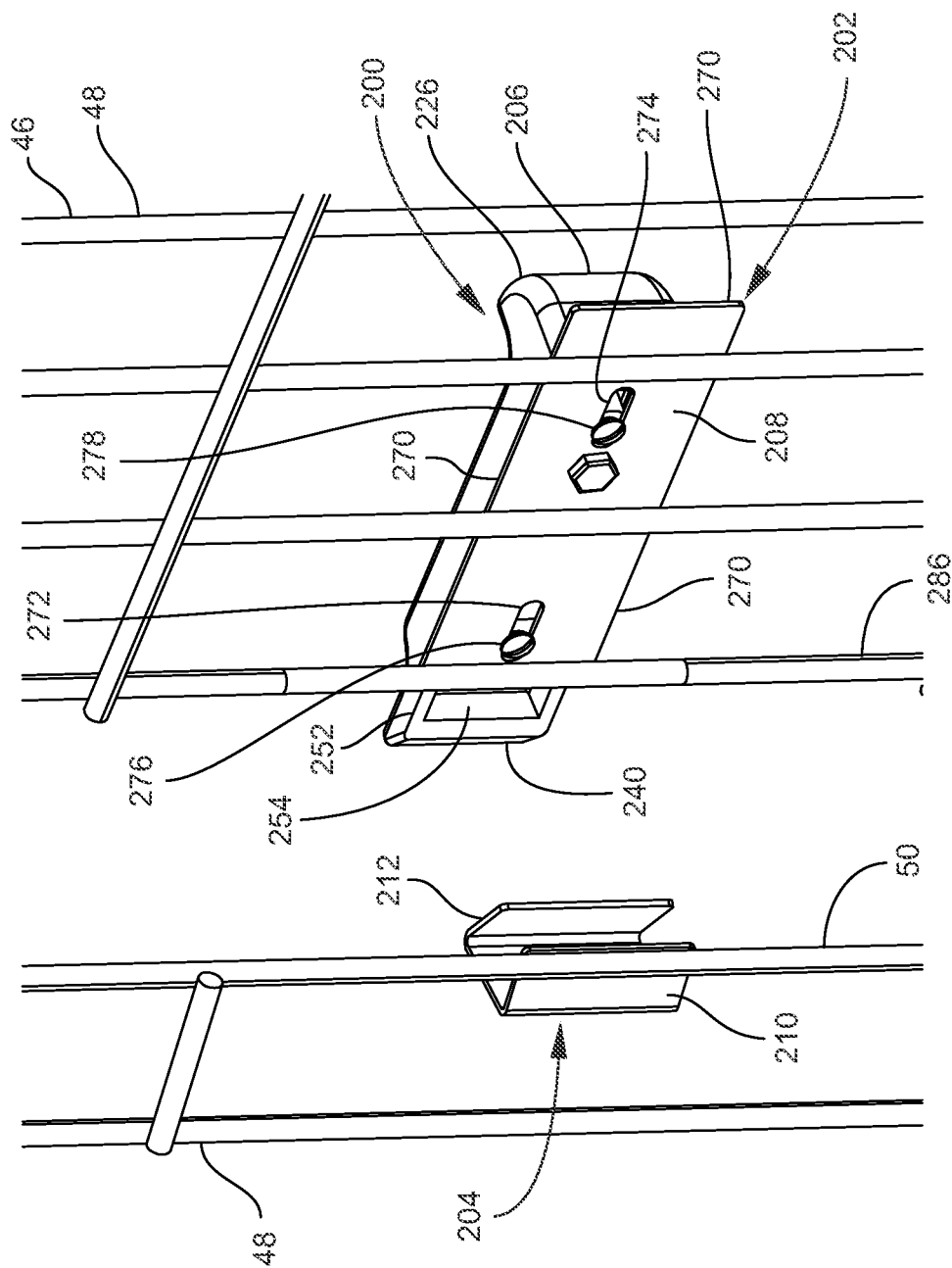
FIG. 13 is a detail rear perspective view of the latch apparatus of FIG. 8 showing the sliding member unlatched from the catch and showing the door of the wire crate open.

Sliding member 206 includes a normally biased position. This may also be called a normally closed position. This normally biased position or normally closed position is shown in each of FIGS. 10, 12, 13 and 14. In the normally closed position, the coil spring 264 assumes a most fully extended condition where the first cavity 254 is most fully open relative to back plate 208. Partially open cavity 254 can be seen in FIG. 12 and in FIG. 13. In the normally closed position, the coil spring 264 has pushed the proximal end of the sliding member 206 as far as possible off the back plate 208. In the normally closed position the coil spring 264 has relatively pushed the back plate 208, via pressure upon post 284, as far as possible beyond the distal end of the sliding member 206. In the normally closed position, the guide pins 276, 278 reside in the proximal ends of the slots 272, 274, as shown in FIG. 13.

Figure 11:
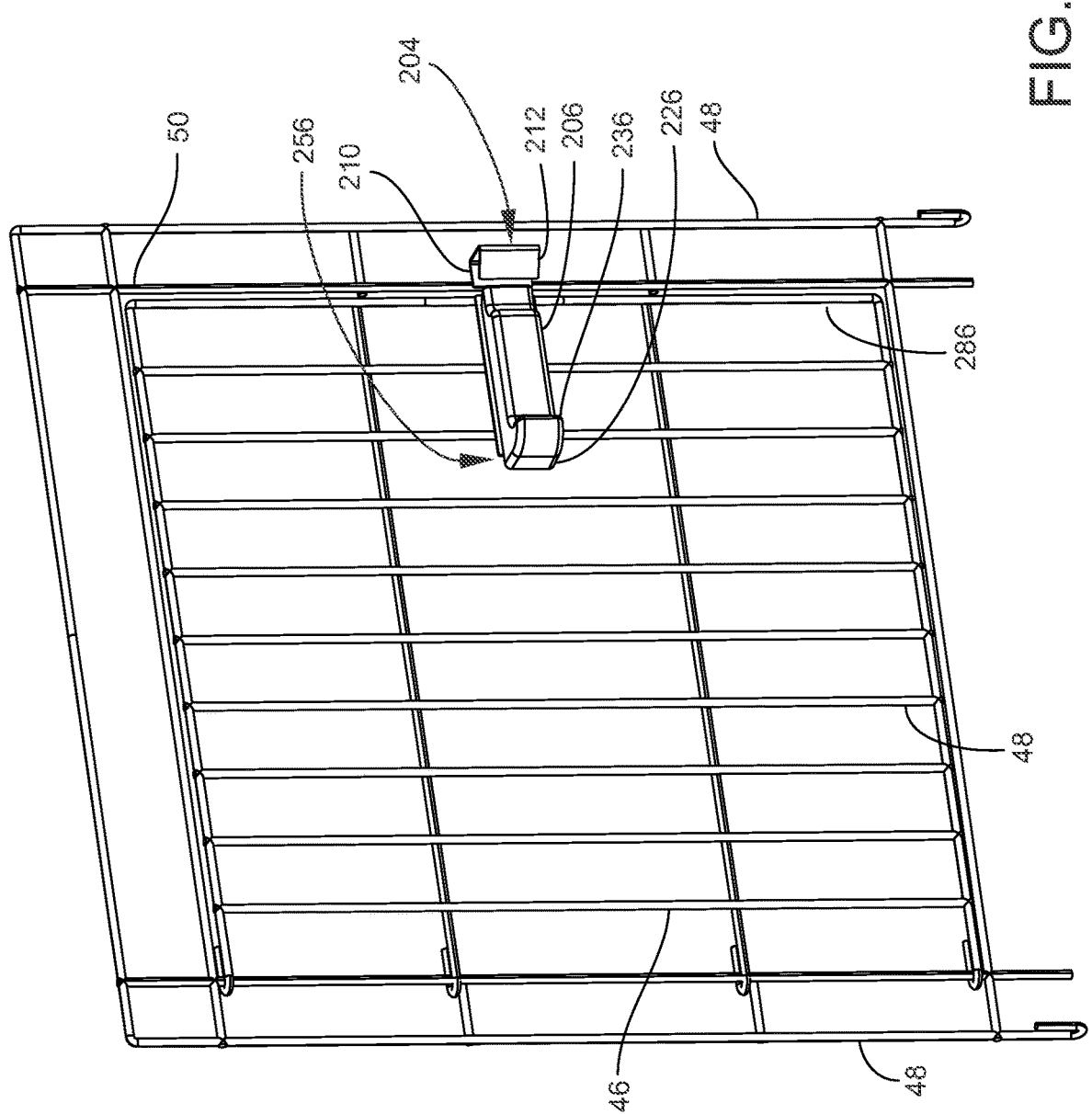
FIG. 11 is a front perspective view of the latch apparatus of FIG. 8 showing the sliding member unlatched from the catch and showing the door of the wire crate closed.

Sliding member 206 includes a position where it has been fully slid against the bias of the coil spring 264. This position can be referred to as a fully compressed condition. This position can be seen in FIG. 11. Here a user has manually slid the sliding member 206 away from and out of engagement with catch 204. In this position, the transverse wall 258 compresses the coil spring 264 against the post 284. In this position, the guide pins 276, 278 reside respectively against the distal ends of the slots 272, 274, which distal ends work as stops to stop the manual sliding of the sliding member 206. In this position, as seen in FIG. 11, the distal end 226 of the sliding member 206 is offset or positioned beyond the distal end of the back plate 208 such that a portion of second cavity 256 is open.

The latch apparatus 10 is engaged, such as by welding, to the front of the wire crate 48 to remove the latch apparatus 10, as far as possible, from manipulation by the animal or pet inside of the wire crate 48 and to position the latch apparatus 10 as close as possible to the user that operates the latch apparatus 10 and opens and closes the door 46 of the wire crate 48.

More specifically, the rear face of the back plate 208 is affixed, such as welding, to three vertical wires or support members 286, 288 and 290 of the door 46 of the wire crate 48. Vertical wire or vertical support member 286 is adjacent to and confronts the door frame or vertical wire 50 of the front side of the wire crate 48. Vertical wires 286 and 50 run parallel to each other. The proximal vertical edge 292 of the back plate 208 is aligned with and defines a transverse plane with the proximal face of wire 286. The proximal face of wire 286 is the portion of the wire 286 that is closest to door frame wire 50.

Catch 204 is affixed to, such as by welding, vertical door frame wire 50. Door frame wire 50 has a proximal face and this portion is the portion of door frame wire 50 that is closest to wire 286. The proximal face of door frame wire 50 is aligned with and defines a transverse plane with a proximal vertical edge 294 of the back plate 210 of catch 204.

Back plate 210 of the catch 204 is rectangular. Opposite of proximal vertical edge 294 is a distal edge 296. Back plate 210 further includes top and bottom edges 298, 300. When door 46 is closed, an extended periphery of the back plates 208, 210 can be defined as all of the edges of the back plates 208, 210 except the proximal vertical edges 292, 294 (i.e., the top and bottom edges of the back plates 208, 210, the distal edge of back plate 208, and the distal edge 296 of back plate 210).

If desired, each of the back plates 208, 210 may be affixed to horizontally running wires of the door 46 or of the wire crate 48.

Catch 204 is horizontally aligned with latch 202. That is, an upper horizontal edge of back plate 210 of the catch 204 is aligned, so as to form a straight line, with the upper horizontal edge of back plate 208 of latch 202. A lower horizontal edge of back plate 210 of catch 204 is aligned, so as to form a straight line, with the lower horizontal edge of back plate 208 of latch 202.

In operation, as shown in FIG. 10, the proximal end 224 of the sliding member 206 is engaged by the catch 202. In this normally closed position, the back plates 208, 210 shield the sliding member 206 from the paw of an animal in the wire crate 48. In other words, the perimeter 252 of the sliding member 206 is set within the extended perimeter of the back plates 208, 210 (i.e., the perimeter 252 of the sliding member 206 is set within the top and bottom edges of the back plates 208, 210 and the distal or outer edges of the back plates 208, 210). This reduced size of the sliding member 206 relative to the back plates 208, 210 minimizes the chances of a paw of an animal gaining access to a portion of the sliding member 206 so as to slide the sliding member 206. In this normally closed or normally biased position, each of the first and second cavities 254, 256 are essentially closed by the back plates 208, 210. Slots 272, 274 provide essentially no access into the cavities 254, 256. Any space between the vertical edges 292 and 294 of the back plates 208, 210 is minimized so as to minimize access into first cavity 254. In the position shown in FIG. 10, door 46 and a front face of the wire crate 48 are coplanar.

As shown in FIG. 11, the sliding member 206 has been manually slid away from the catch 204 such that the door 46 may be opened relative to the front face of the wire crate 48 and such that the proximal end 224 of the sliding member 206 can swing past the proximal vertical edge of the oblique portion 212. In this position as shown in FIG. 11, the coil spring 264 has attained its most fully compressed condition and guide pins 276, 278 reside against the distal ends of the slots 272, 274, thereby preventing further sliding of the sliding member 206 in a direction from the proximal end 224 to the distal end 226 of the sliding member 206. In this position shown in FIG. 11, the distal end 226 of the sliding member 206 has slid partially beyond the distal vertical edge of the back plate 208 such that the second cavity 256 is exposed or open relative to the back plate 208. Further in this position shown in FIG. 11, the first cavity 254 is covered by the back plate 208 such that the first cavity 254 moves from a position where it is covered by the back plate 210 of the catch 204 to a position where it is covered by the back plate 208 of the latch 202.

Figure 14:
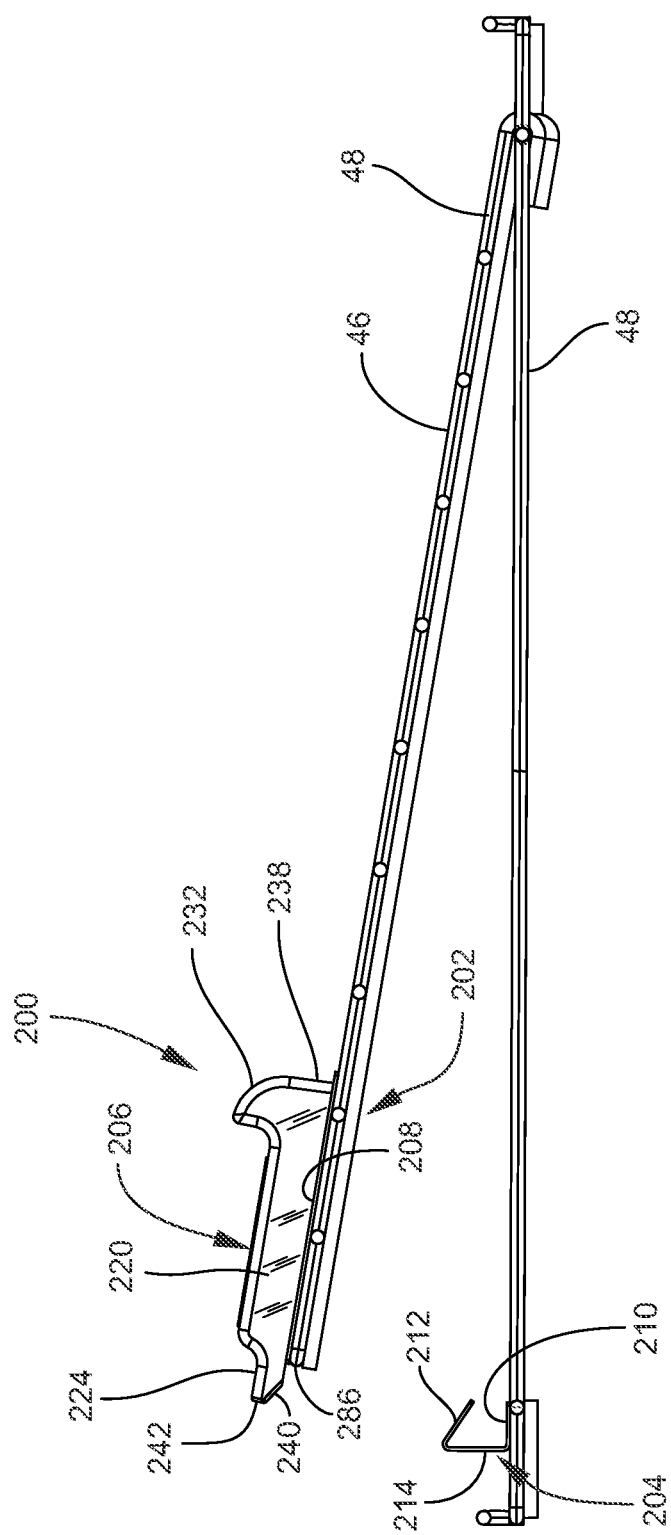
FIG. 14 is a top view of the latch apparatus of FIG. 8.

FIGS. 12, 13 and 14 show that door 46 has been opened relative to the front face of the wire crate 48 and that the sliding member 206 has been manually released such that the sliding member 206 automatically returns, under the expansion of the coil spring 264, to its normally closed or normally biased position where the first cavity 254 is partially exposed relative to the back plate 208 of the latch 202 and where the second cavity 256 has slid back to a position to where it is covered by the back plate 208 of the latch 202 and where the distal end 226 of the latch 202 is found within the perimeter 270 of the back plate 208 and within the distal edge of the back plate 208. In the position shown in FIGS. 12, 13 and 14, the oblique face or surface 240 of the proximal end 224 of the sliding member 206 is ready and in position to hit and slide against the oblique face or oblique portion 212 of the catch 204 so as to propel the sliding member 206 as a whole in a direction from the proximal end 224 to the distal end 226 of the sliding member 206 whereupon, when the proximal most edge of face 240 clears the proximal most edge of oblique face 212, the coil spring 264 expands to push the proximal end 224 into the catch 204.

If desired, the catch 204 may be manufactured such that the oblique portion 212 is resilient, i.e., gives when it is hit by the proximal end 224 of the sliding member 206 when the sliding member 206 is being swung with the door 46 from an open to a closed position, and then returns to an original position once the proximal end 224 has slid off.

If desired, the catch 204 may be manufactured to be rigid, i.e., such that the oblique portion 212 provides no give when it is hit by the proximal end 224 of the sliding member 206 when the sliding member 206 is being swung with the door 46 from an open position to a closed position.

It should be noted that the body 216 of the sliding member 206 may be molded in one piece such that the body 216 is integral and one-piece.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A latch apparatus for latching first and second pieces together, one of the first and second pieces being swingable relative to the other of the first and second pieces, comprising:

a) a latch, the latch engaged to the first piece, the latch comprising a sliding member, the sliding member having a proximal end and a distal end, the sliding member having a bias in a direction from the distal end to the proximal end of the sliding member such that the sliding member is biased to slide in the direction from the distal end to the proximal end of the sliding member; and b) a catch, the catch being engaged to the second piece, the sliding member and catch engagable to each other and disengagable from each other, the catch comprising an oblique front portion and a back portion, the oblique front portion and back portion being spaced from each other, the oblique front portion having a distal end, a proximal end, and an oblique surface extending between the distal and proximal ends of the oblique front portion, the proximal end of the oblique front portion being spaced from the back portion by a first distance and defining a catch space, the distal end of the oblique front portion being spaced from the back portion by a second distance, the second distance being greater than the first distance such that, when the first piece and sliding member swing toward the back portion of the catch to engage the catch, the oblique surface directs the sliding member to slide against said bias to slide the sliding member over the proximal end of the oblique front portion, whereupon the sliding member reverses a slide direction to slide under the bias in the direction from the distal end to the proximal end of the sliding member such that the proximal end of the sliding member is pushed under the proximal end of the oblique front portion such that the sliding member engages the catch;

c) wherein the latch includes a back plate upon which the sliding member slides, the back plate of said latch defining a first plane, and the back portion of the catch being in said first plane when the first and second pieces are closed and latched to each other by said latch and catch;

d) wherein the sliding member includes a first cavity and a second cavity, the first cavity being adjacent to the proximal end of the latch, the first and second cavities being separated by a transverse member, the back plate closing off the second cavity when the sliding member is in a normal biased position, at least a part of the first cavity being open relative to the back plate when the sliding member is in said normal biased position and the first piece has been swung away from the second piece;

e) the sliding member being slideable on each of the back plate of the latch and the back portion of the catch when the first and second pieces have been swung together; and f) the back portion of the catch closing off the first cavity and the back plate of the latch closing off the second cavity when the sliding member is in said normal biased position and when the first and second pieces are closed and latched to each other by said latch and catch.

2. The latch apparatus of claim 1, wherein the latch includes a coil spring having first and second ends, the back plate having an extension protruding into the sliding member, the sliding member having an intermediate section between the proximal and distal ends of the sliding member, and the coil spring being in the sliding member and between the extension of the back plate and the intermediate section of the sliding member such that the first end of the coil spring brings pressure to bear upon said extension and the second end of the coil spring brings pressure to bear upon said intermediate section such that the proximal end of the sliding member is normally biased in a direction from the distal end to the proximal end of the sliding member.

3. The latch apparatus of claim 1, wherein one of the back plate and sliding member includes a first slot, the other of the back plate and sliding member having a first guide pin extending into the first slot, the first slot defining a direction toward the catch such that the sliding member slides to and away from the catch.

4. The latch apparatus of claim 1, wherein one of the back plate and sliding member includes first and second slots, the other of the back plate and sliding member having first and second guide pins, the first guide pin extending into the first slot, the second guide pin extending into the second slot, and at least one of the first and second slots defining a direction toward the catch such that the sliding member slides to and away from the catch.

5. The latch apparatus of claim 4, wherein the first and second slots are aligned with each other and each of the first and second slots define a direction toward the catch such that the sliding member slides to and away from the catch.

6. The latch apparatus of claim 1, wherein the latch includes a front surface and a back member, the front surface and the back member opposing each other, the front surface having a proximal surface section, a distal surface section, and an intermediate surface section between the proximal surface section and the distal surface section, the proximal surface section being closer to the catch than the distal surface section, the proximal surface section of the latch engaging the catch, the distal surface section having a transverse wall extending in a direction away from the back member and away from the intermediate surface section, the transverse wall facing the catch such that, when a finger slides over the intermediate surface section toward the distal surface section, the finger engages the transverse wall to slide the latch against said bias.

7. The latch apparatus of claim 1, wherein the proximal end of the sliding member includes a first width less than the width of the catch space and wherein the distal end of the sliding member includes a transverse wall that is transverse relative to a direction that the sliding member slides, the transverse wall facing said catch such that a finger can engage the transverse wall and slide the latch against said bias to remove the proximal end of the sliding member from the catch space.

8. The latch apparatus of claim 1, wherein the catch includes a transverse portion extending between the back portion and the oblique front portion, the back portion engaging the distal end of the oblique front portion such that the proximal end of the oblique front portion is free such that the proximal end of the latch can slide under the proximal end of the oblique front portion.

9. The latch apparatus of claim 1, wherein the catch includes a transverse portion extending between the back portion and the oblique portion, each of the back portion, oblique portion and transverse portion defining a plane, the back portion and transverse portion being at a right angle relative to each other, the oblique portion being at an acute angle relative to the transverse portion.

10. The latch apparatus of claim 1, wherein at least a part of a front face of said back plate is exposed when the sliding member is in a normal biased position.

11. The latch apparatus of claim 1, wherein the back plate closes off each of the first and second cavities when the sliding member has been fully slid against a bias of the sliding member.

12. The latch apparatus of claim 1, wherein the sliding member is slideable to a position where each of said first and second cavities is closed off by said back plate.

13. A latch apparatus for latching first and second pieces together, one of the first and second pieces being swingable relative to the other of the first and second pieces, comprising:

a) a latch having a sliding member and a back plate, the latch being on the first piece;

b) a catch for engaging said sliding member, the catch being on the second piece, the catch having a back portion;

c) the sliding member having a cavity that confronts said back plate, the cavity having first and second cavity portions;

d) the slideable member having a first position where a section of the first cavity portion is exposed relative to the back plate, where the second cavity portion is covered by the back plate, where the catch and latch are unengaged, and where the first and second pieces have been swung away from each other;

e) the slideable member having a second position where the first cavity portion is closed relative to the back plate and where a section of the second cavity portion is exposed relative to the back plate; and f) the slideable member having a third position where the back portion of the catch closes off the first cavity portion and the back plate of the latch closes off the second cavity portion, where the sliding member is engaged to the catch, and where the first and second pieces are closed.

14. A latch apparatus for latching first and second pieces together, one of the first and second pieces being swingable relative to the other of the first and second pieces, comprising:

a) a latch, the latch engaged to the first piece, the latch comprising a sliding member, the sliding member having a proximal end and a distal end, the sliding member having a bias in a direction from the distal end to the proximal end of the sliding member such that the sliding member is biased to slide in the direction from the distal end to the proximal end of the sliding member; and
b) a catch, the catch being engaged to the second piece, the sliding member and catch engagable to each other and disengagable from each other, the catch comprising an oblique front portion and a back portion, the oblique front portion and back portion being spaced from each other, the oblique front portion having a distal end, a proximal end, and an oblique surface extending between the distal and proximal ends of the oblique front portion, the proximal end of the oblique front portion being spaced from the back portion by a first distance and defining a catch space, the distal end of the oblique front portion being spaced from the back portion by a second distance, the second distance being greater than the first distance such that, when the first piece and sliding member swing toward the back portion of the catch to engage the catch, the oblique surface directs the sliding member to slide against said bias to slide the sliding member over the proximal end of the oblique front portion, whereupon the sliding member reverses a slide direction to slide under the bias in the direction from the distal end to the proximal end of the sliding member such that the proximal end of the sliding member is pushed under the proximal end of the oblique front portion such that the sliding member engages the catch;
c) the sliding member including a body, the body including a front side, a top side, a bottom side, a proximal end, a distal end, and an open back side;
d) the latch including a back plate, the back plate of the latch and the back portion of the catch closing off the open back side of the sliding member when the catch and latch are engaged and when the first and second pieces are closed; and
e) the front side of the latch including a first step and a second step and an intermediate section between the first and second steps, the first step being spaced from the back plate by a first distance, the intermediate section being spaced from the back plate by a second distance, and the second step being spaced from the back plate by a third distance, the first distance being less than the second distance, the second distance being less than the third distance, the first step being closer to the catch than the second step.

* * * * *